(12) United States Patent
Usukura

(10) Patent No.: US 12,174,386 B2
(45) Date of Patent: Dec. 24, 2024

(54) DISPLAY DEVICE INCLUDING A FIRST LENS AND A SECOND LENS HAVING SHAPES ASYMMETRIC ABOUT A SEMI-TRANSPARENT MIRROR, AND HEAD-MOUNTED DISPLAY

(71) Applicant: Sharp Display Technology Corporation, Kameyama (JP)

(72) Inventor: Naru Usukura, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/519,376

(22) Filed: Nov. 27, 2023

(65) Prior Publication Data

US 2024/0210699 A1 Jun. 27, 2024

(30) Foreign Application Priority Data

Dec. 22, 2022 (JP) ................................ 2022-205696

(51) Int. Cl.
*G02B 27/01* (2006.01)
*G02B 5/30* (2006.01)
(Continued)

(52) U.S. Cl.
CPC ....... *G02B 27/0172* (2013.01); *G02B 5/3016* (2013.01); *G02B 27/0179* (2013.01); *G02B 27/0955* (2013.01); *G02B 27/141* (2013.01); *G02B 27/283* (2013.01); *G02B 2027/0187* (2013.01)

(58) Field of Classification Search
None
See application file for complete search history.

(56) References Cited

U.S. PATENT DOCUMENTS 6,094,242 A * 7/2000 Yamanaka ............. G02B 27/28
349/98
6,271,969 B1 8/2001 Mertz
(Continued)

FOREIGN PATENT DOCUMENTS

JP 3295583 B2 6/2002
JP 4408159 B2 2/2010
(Continued)

*Primary Examiner* — Kirk W Hermann
(74) *Attorney, Agent, or Firm* — Keating & Bennett, LLP

(57) ABSTRACT

A display device includes a display panel, a linearly polarizing plate, and a first polarized light-selective reflector disposed sequentially toward a viewer; a first phase difference plate and a first lens disposed closer to the viewer relative to the first polarized light-selective reflector and facing each other; a semi-transparent mirror disposed closer to the viewer relative to the first phase difference plate and the first lens; a second lens and a second phase difference plate disposed closer to the viewer relative to the semi-transparent mirror and facing each other; and a second polarized light-selective reflector disposed closer to the viewer relative to the second lens and the second phase difference plate. The first lens and the second lens have shapes asymmetric about the semi-transparent mirror as a plane of symmetry in a cross-sectional view in a direction from the display panel toward the second polarized light-selective reflector.

10 Claims, 15 Drawing Sheets

(51) Int. Cl.
*G02B 27/09* (2006.01)
*G02B 27/14* (2006.01)
*G02B 27/28* (2006.01)

(56) References Cited

U.S. PATENT DOCUMENTS

| | | |
|---|---|---|
| 6,304,303 B1 | 10/2001 | Yamanaka |
| 2018/0088332 A1 | 3/2018 | Li et al. |
| 2018/0120564 A1 | 5/2018 | Li et al. |
| 2018/0164590 A1 | 6/2018 | Li et al. |
| 2021/0271082 A1 | 9/2021 | Smith et al. |
| 2023/0022744 A1* | 1/2023 | Sato .................. G02B 27/0103 |

FOREIGN PATENT DOCUMENTS

| | | |
|---|---|---|
| JP | 6340085 B2 | 6/2018 |
| JP | 6377765 B2 | 8/2018 |
| JP | 6389273 B2 | 9/2018 |
| WO | 2021/200428 A1 | 10/2021 |

* cited by examiner

Spot diagram

DISPLAY DEVICE INCLUDING A FIRST LENS AND A SECOND LENS HAVING SHAPES ASYMMETRIC ABOUT A SEMI-TRANSPARENT MIRROR, AND HEAD-MOUNTED DISPLAY

CROSS-REFERENCE TO RELATED APPLICATIONS

The present application claims priority under 35 U.S.C. § 119 to Japanese Patent Application No. 2022-205696 filed on Dec. 22, 2022, the contents of which are incorporated herein by reference in their entirety.

BACKGROUND OF THE INVENTION

Field of the Invention

The present disclosure relates to display devices and head-mounted displays including the display devices.

Description of Related Art

A head-mounted display (HMD) is a display device that outputs images such that a viewer (user) can see the images while wearing the HMD on the head. HMDs include, for example, immersive HMDs designed to cover both eyes to provide images displayed on the HMD to the viewer's field of view. Immersive HMDs create a deep sense of immersion by blocking out external light and are also called virtual reality (VR) devices.

Recent years have seen a growing attention to a virtual space called metaverse. VR-HMDs are a tool to access the virtual world, and thus their market is expected to grow. VR-HMDs, however, have an issue that the housing of the HMD is large, and are desired to be compact for popularization of VR-HMDs.

For achievement of a compact size, folded optics (including those called "pancake lenses") has been actively developed that includes a semi-transparent mirror, a reflective polarizing plate (e.g., product name "APF" available from 3M Company), and a λ/4 film and utilizes the polarization features (e.g., JP 3295583 B, JP 4408159 B, JP 6340085 B, JP 6377765 B, JP 6389273 B). Although such an optical system can be expected to have a thin profile, there is an issue that use of the semi-transparent mirror results in a light use efficiency of 25%, in principle.

Techniques to increase the light use efficiency include one disclosed in US 2021/0271082 A. The technique relates to a head-mounted display that includes a display medium having a plurality of pixels and configured to emit light from at least one of the plurality of pixels; an optical arrangement providing at least two light paths for the emitted light; wherein the optical arrangement comprises: a first polarization selective mirror configured to transmit a first polarization component of the emitted light; a second polarization selective mirror configured to transmit a second polarization component of the emitted light; and a partial mirror between the first polarization selective mirror and the second polarization selective mirror.

Also, WO 2021/200428 discloses an optical element including, in the following order: a first absorptive linearly polarizing plate; a first reflective linearly polarizing plate; a first retardation plate; a partially reflecting mirror that allows transmission of a part of incident light and reflects a part of the incident light; a second retardation plate; and a second reflective linearly polarizing plate, wherein a turning direction of circularly polarized light that is reflected in a case where light transmits through the first retardation plate and is incident into the first reflective linearly polarizing plate is opposite to a turning direction of circularly polarized light that is reflected in a case where light transmits through the second retardation plate and is incident into the second reflective linearly polarizing plate.

BRIEF SUMMARY OF THE INVENTION

The head-mounted display of US 2021/0271082 A and the optical element of WO 2021/200428, for example, have the structure of a display device of a comparative embodiment shown in FIG. 18. A display device 100R of the comparative embodiment includes, sequentially toward the viewer U, a display panel 10, a linearly polarizing plate 20, a first polarized light-selective reflector 31, a first phase difference plate 41, a first lens 51R, a semi-transparent mirror 60, a second lens 52R, a second phase difference plate 42, and a second polarized light-selective reflector 32. The first phase difference plate 41 and the second phase difference plate 42 are each a λ/4 plate. The components may be bonded to one another with an adhesive or may be arranged with an air layer in between. The number of lenses may be three or more. FIG. 18 is an exploded cross-sectional view schematically showing the display device of the comparative embodiment.

In a conventional display device utilizing a pancake lens, light emitted from a display panel reaches the viewer through only one path. Meanwhile, in the display device 100R of the comparative embodiment, light emitted from the display panel 10, as shown in FIG. 18, can take a first path R1 and a second path R2, which can increase the light use efficiency. Such a display system is also referred to as a double path system.

The structure of the display device 100R of the comparative embodiment, however, is limited as it is an optical system symmetric about the semi-transparent mirror 60. The thickness of the device tends to increase especially when lenses having a common shape are used. The display device thus still leave room for improvement in terms of thickness and display quality.

In response to the above issues, an object of the present invention is to provide a display device that can have a thin profile and can exhibit enhanced display characteristics, and a head-mounted display including the display device.

(1) One embodiment of the present invention is directed to a display device including: a display panel, a linearly polarizing plate, and a first polarized light-selective reflector disposed sequentially toward a viewer; a first phase difference plate and a first lens that are disposed closer to the viewer relative to the first polarized light-selective reflector and face each other; a semi-transparent mirror disposed closer to the viewer relative to the first phase difference plate and the first lens; a second lens and a second phase difference plate that are disposed closer to the viewer relative to the semi-transparent mirror and face each other; and a second polarized light-selective reflector disposed closer to the viewer relative to the second lens and the second phase difference plate, the first lens and the second lens having shapes asymmetric about the semi-transparent mirror as a plane of symmetry in a cross-sectional view in a direction from the display panel toward the second polarized light-selective reflector.

(2) In an embodiment of the present invention, the display device includes the structure (1), the first lens is a first Fresnel lens with a first step, and the second lens is a second Fresnel lens with a second step.

(3) In an embodiment of the present invention, the display device includes the structure (2), and in a cross-sectional view in a direction from the display panel toward the second polarized light-selective reflector, the first step and the second step have shapes asymmetric about the semi-transparent mirror as a plane of symmetry.

(4) In an embodiment of the present invention, the display device includes the structure (2) or (3), and the first step is located only in a region where an angle of incidence of video light from the display panel relative to a visual axis of the viewer is 30° or greater and in a region where the angle of incidence of video light is −30° or smaller, the angle of incidence being measured in a state where eyes of the viewer directly in front of a center of the display panel are directed to the center of the display panel.

(5) In an embodiment of the present invention, the display device includes the structure (2), (3), or (4), and the second step is located only in a region where an angle of incidence of video light from the display panel relative to a visual axis of the viewer is 30° or greater and in a region where the angle of incidence of video light is −30° or smaller, the angle of incidence being measured in a state where eyes of the viewer directly in front of a center of the display panel are directed to the center of the display panel.

(6) In an embodiment of the present invention, the display device includes the structure (1), (2), (3), (4), or (5), and in a cross-sectional view in a direction from the display panel toward the second polarized light-selective reflector, the first lens and the second lens have shapes asymmetric about the semi-transparent mirror as a plane of symmetry in a region where an angle of incidence of video light from the display panel relative to a visual axis of the viewer is 30° or greater and in a region where the angle of incidence of video light is −30° or smaller, the angle of incidence being measured in a state where eyes of the viewer directly in front of a center of the display panel are directed to the center of the display panel, and the first lens and the second lens have shapes symmetric about the semi-transparent mirror as a plane of symmetry in a region where the angle of incidence of video light from the display panel relative to the visual axis of the viewer is greater than −30° and smaller than 30°.

(7) In an embodiment of the present invention, the display device includes the structure (1), (2), (3), (4), (5), or (6), and further includes a third lens located outside a region between the first polarized light-selective reflector and the second polarized light-selective reflector.

(8) In an embodiment of the present invention, the display device includes the structure (1), (2), (3), (4), (5), (6), or (7), and a panel including the display panel and the linearly polarizing plate is a liquid crystal panel including a liquid crystal layer.

(9) In an embodiment of the present invention, the display device includes the structure (1), (2), (3), (4), (5), (6), or (7), and the display panel is a self-luminous panel.

(10) Another embodiment of the present invention is directed to a head-mounted display including: the display device having the structure (1), (2), (3), (4), (5), (6), (7), (8), or (9); and a wearable part to be worn on a head of the viewer.

The present invention can provide a display device that can have a thin profile and can exhibit enhanced display characteristics, and a head-mounted display including the display device.

DETAILED DESCRIPTION OF THE INVENTION

Hereinafter, the present invention is described in detail based on embodiments with reference to the drawings. The present invention is not limited to these embodiments.

Embodiment 1

Figure 1:
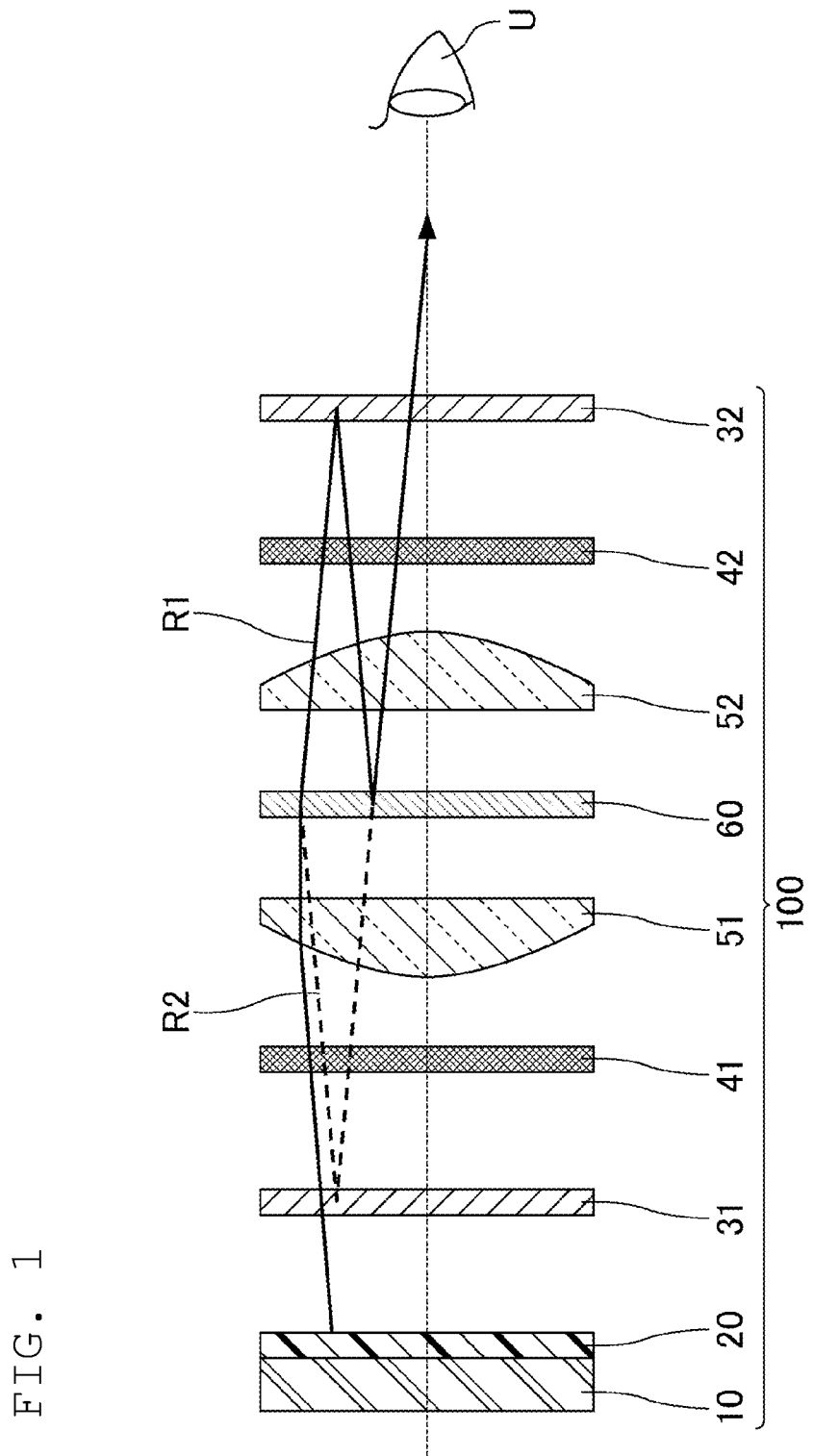
FIG. 1 is an exploded cross-sectional view schematically showing a display device of Embodiment 1.
Figure 2:
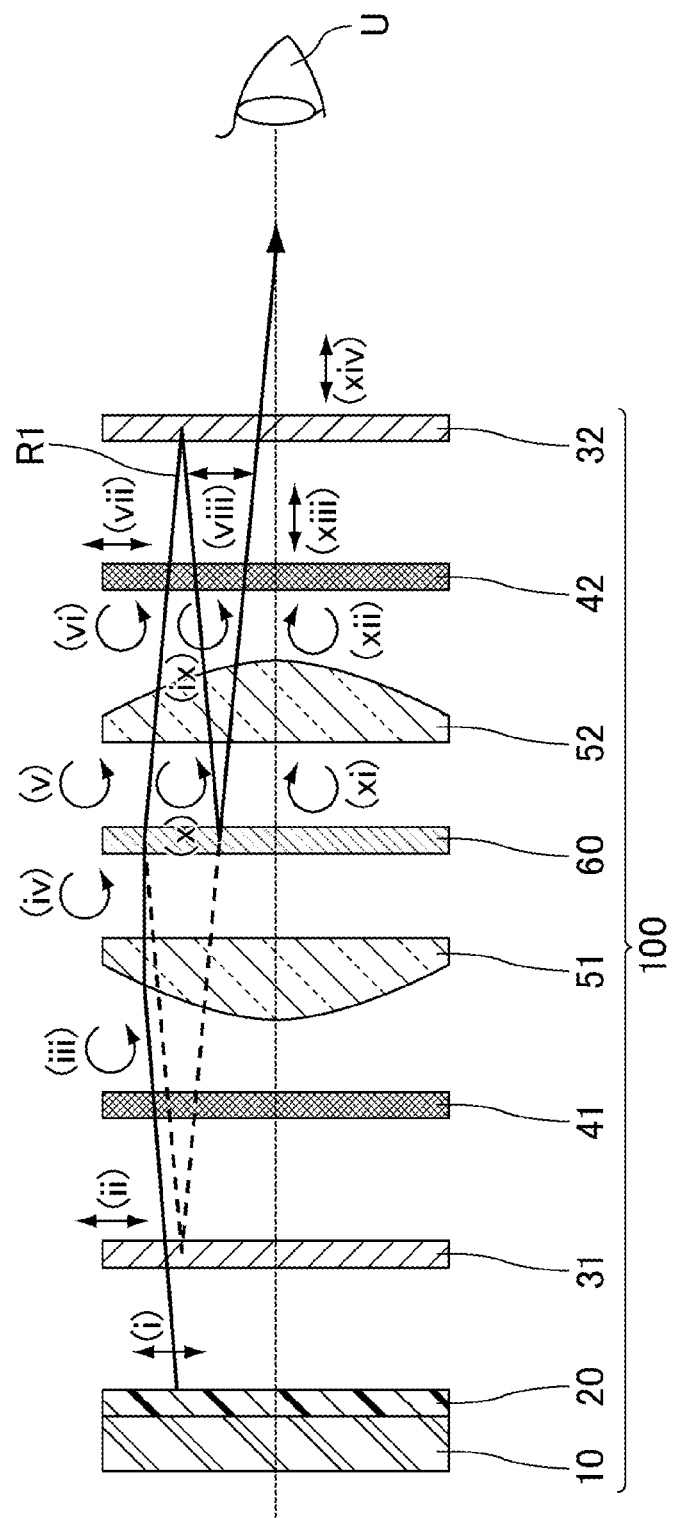
FIG. 2 is an exploded cross-sectional view schematically showing a first path of light in the display device of Embodiment 1.
Figure 3:
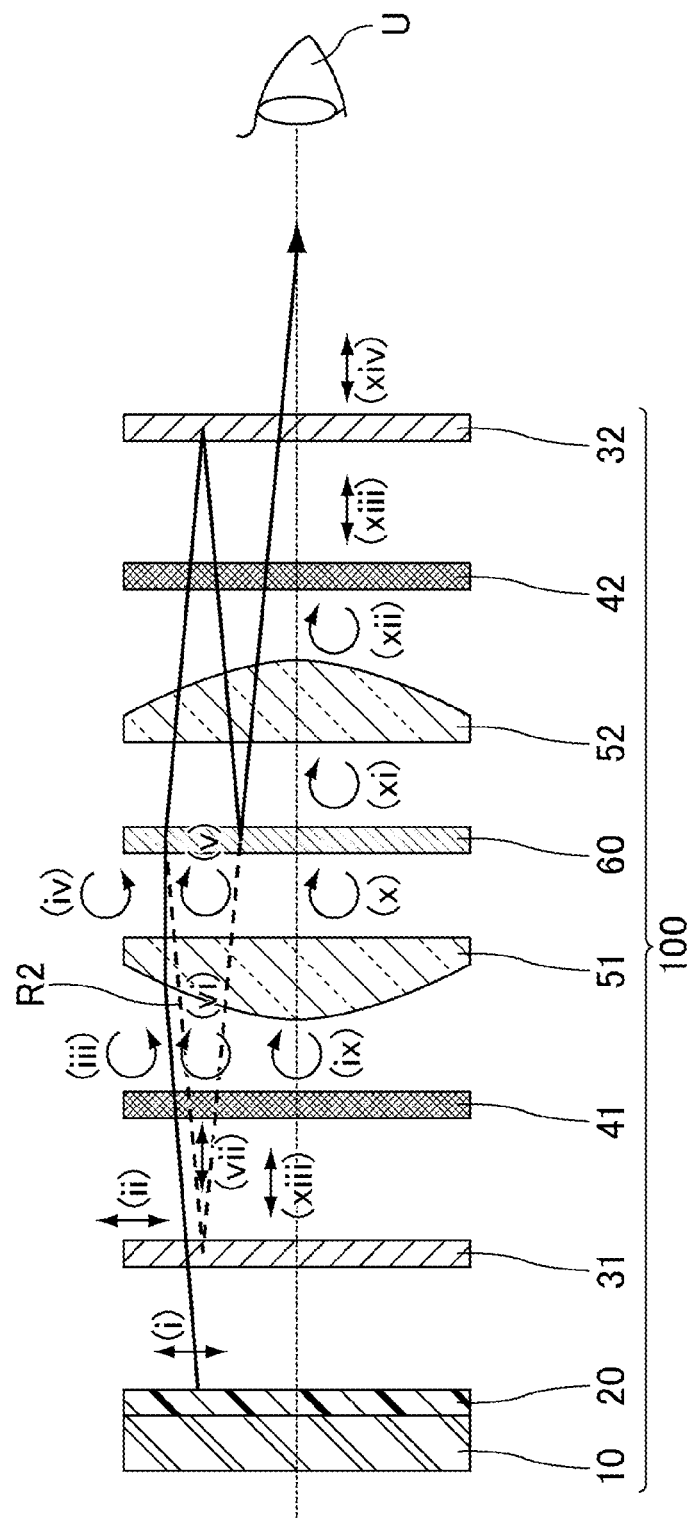
FIG. 3 is an exploded cross-sectional view schematically showing a second path of light in the display device of Embodiment 1.
Figure 4:
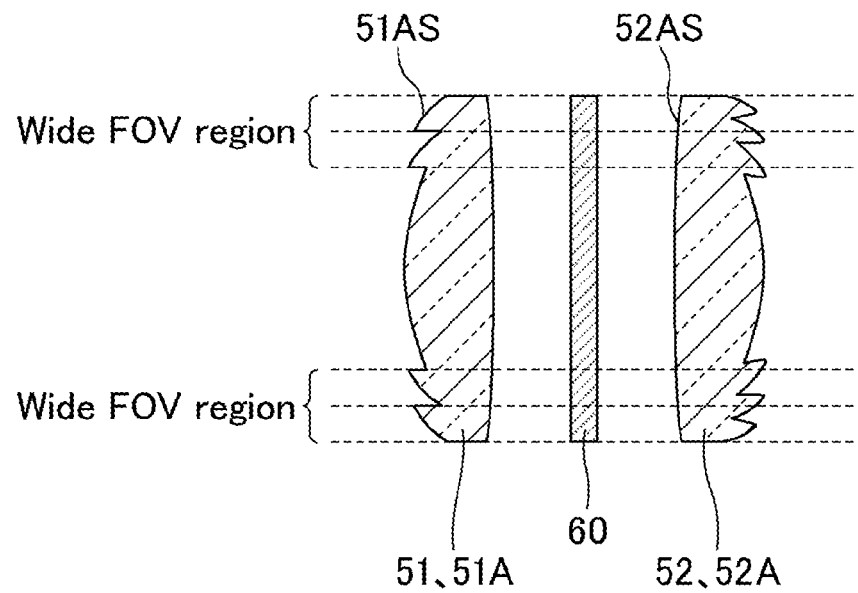
FIG. 4 is a schematic cross-sectional view of a first lens and a second lens in the display device of Embodiment 1.

FIG. 1 is an exploded cross-sectional view schematically showing a display device of Embodiment 1. FIG. 2 is an exploded cross-sectional view schematically showing a first path of light in the display device of Embodiment 1. FIG. 3 is an exploded cross-sectional view schematically showing a second path of light in the display device of Embodiment 1. FIG. 4 is a schematic cross-sectional view of a first lens and a second lens in the display device of Embodiment 1.

As shown in FIG. 1 to FIG. 3, a display device 100 of the present embodiment includes a display panel 10, a linearly polarizing plate 20, and a first polarized light-selective reflector 31 disposed sequentially toward the viewer; a first phase difference plate 41 and a first lens 51 that are disposed closer to the viewer relative to the first polarized light-selective reflector 31 and face each other; a semi-transparent mirror 60 disposed closer to the viewer relative to the first phase difference plate 41 and the first lens 51; a second lens 52 and a second phase difference plate 42 that are disposed closer to the viewer relative to the semi-transparent mirror 60 and face each other; and a second polarized light-selective reflector 32 disposed closer to the viewer relative to the second lens 52 and the second phase difference plate 42. As shown in FIG. 4, in a cross-sectional view in the direction from the display panel 10 toward the second polarized light-selective reflector 32, the first lens 51 and the second lens 52 have shapes asymmetric about the semi-transparent mirror 60 as a plane of symmetry. This structure enables a display device to have a thin profile and exhibit enhanced display characteristics. Although the exploded cross-sectional views herein each show the components with spaces in between, the components may be bonded to one another or may be spaced from one another. In other words, the functional layers and lenses may be bonded to one another or may be arranged with an air layer in between. The number of lenses may not be one and may be two or more.

As shown in FIG. 1 to FIG. 3, the present embodiment is directed to a display device 100 including, sequentially toward the viewer, the display panel 10, the linearly polarizing plate 20, the first polarized light-selective reflector 31, the first phase difference plate 41, the first lens 51, the semi-transparent mirror 60, the second lens 52, the second phase difference plate 42, and the second polarized light-selective reflector 32. Yet, the positions of the first phase difference plate 41 and the first lens 51 may be switched and the positions of the second phase difference plate 42 and the second lens 52 may also be switched. In other words, the present embodiment is directed to a mode where the first lens 51 is disposed closer to the viewer relative to the first phase difference plate 41 and the second phase difference plate 42 is disposed closer to the viewer relative to the second lens 52, wherein the first lens 51 may be disposed closer to the viewer relative to the first phase difference plate 41 while the second lens 52 may be disposed closer to the viewer relative to the second phase difference plate 42, the first phase difference plate 41 may be disposed closer to the viewer relative to the first lens 51 while the second phase difference plate 42 may be disposed closer to the viewer relative to the second lens 52, or the first phase difference plate 41 may be disposed closer to the viewer relative to the first lens 51 while the second lens 52 may be disposed closer to the viewer relative to the second phase difference plate 42.

A cross section taken in a direction from the display panel 10 toward the second polarized light-selective reflector 32 may be, for example, a cross section taken in a vertical direction relative to the viewer U. A cross section taken in a vertical direction relative to the viewer U means a surface that includes the viewer U and the display panel 10 and lies in the vertical direction relative to the viewer U.

In a case where two components have shapes asymmetric about a certain surface as a plane of symmetry, for example, at least part of one of the two components and at least part of the other of the two components have shapes asymmetric about the certain surface as a plane of symmetry. Specifically, a first part of a first component and a first part of a second component have shapes asymmetric about the certain surface as a plane of symmetry, while a second part of the first component and a second part of the second component may have shapes symmetric about the certain surface as a plane of symmetry and the whole of the first component and the whole of the second component may have shapes asymmetric about the certain surface as a plane of symmetry.

In a case where the first lens 51 and the second lens 52 have shapes asymmetric about the semi-transparent mirror 60 as a plane of symmetry, for example, at least part of the first lens 51 and at least part of the second lens 52 have shapes asymmetric about the semi-transparent mirror 60 as a plane of symmetry. Specifically, a first part of the first lens 51 and a first part of the second lens 52 have shapes asymmetric about the semi-transparent mirror 60 as a plane of symmetry, while a second part of the first lens 51 and a second part of the second lens 52 may have shapes symmetric about the semi-transparent mirror 60 as a plane of symmetry and the whole of the first lens 51 and the whole of the second lens 52 may have shapes asymmetric about the semi-transparent mirror 60 as a plane of symmetry.

As shown in FIG. 1 to FIG. 3, the display device 100 of the present embodiment can achieve folded optics using the semi-transparent mirror 60, which allows the display device 100 to have a thin profile.

Light emitted from the display panel 10 can take the first path R1 and the second path R2, which can increase the light use efficiency. Polarization state of light changes as shown in FIG. 2 when the light takes the first path R1.

The display panel 10 emits light (display light) toward the viewer U, and the linearly polarizing plate 20 converts the display light from the display panel 10 to linearly polarized light ((i) in FIG. 2, e.g., linearly polarized light oscillating in the vertical direction). The linearly polarized light having passed through the linearly polarizing plate 20 passes in the same polarization state through the first polarized light-selective reflector 31 ((ii) in FIG. 2, e.g., linearly polarized light oscillating in the vertical direction). The linearly polarized light having passed through the first polarized light-selective reflector 31 is then converted to circularly polarized light by a $\lambda/4$ plate as the first phase difference plate 41 ((iii) in FIG. 2, e.g., counterclockwise circularly polarized light). The circularly polarized light having passed through the first phase difference plate 41 passes in the same polarization state through the first lens 51, the semi-transparent mirror 60, and the second lens 52 ((iv) to (vi) in FIG. 2, e.g., counterclockwise circularly polarized light). The circularly polarized light having passed through the second lens 52 passes through a $\lambda/4$ plate as the second phase difference plate 42 to be converted to linearly polarized light ((vii) in FIG. 2, e.g., linearly polarized light oscillating in the vertical direction). The linearly polarized light having passed through the second phase difference plate 42 is reflected in the same polarization state by the second polarized light-selective reflector 32 ((viii) in FIG. 2, e.g., linearly polarized light oscillating in the vertical direction).

The linearly polarized light reflected by the second polarized light-selective reflector 32 is converted to circularly polarized light by the second phase difference plate 42 ((ix) in FIG. 2, e.g., counterclockwise circularly polarized light). The circularly polarized light having passed through the second phase difference plate 42 passes in the same polarization state through the second lens 52 ((x) in FIG. 2, e.g., counterclockwise circularly polarized light). The circularly polarized light having passed through the second lens 52 is reflected by the semi-transparent mirror 60 to be converted to circularly polarized light rotating in reverse ((xi) in FIG. 2, for example, clockwise circularly polarized light). The circularly polarized light having been reflected by the semi-transparent mirror 60 passes in the same polarization state through the second lens 52 ((xii) in FIG. 2, e.g., clockwise circularly polarized light). The circularly polarized light having passed through the second lens 52 passes through the second phase difference plate 42 to be converted to linearly polarized light ((xiii) in FIG. 2, e.g., linearly polarized light oscillating in the horizontal direction). The linearly polarized light having passed through the second phase difference plate 42 passes in the same polarization state through the second polarized light-selective reflector 32 to be perceived by the viewer U ((xiv) in FIG. 2, e.g., linearly polarized light oscillating in the horizontal direction).

The polarization state of light changes as shown in FIG. 3 when the light takes the second path R2. The display panel 10 emits light (display light) toward the viewer U, and the linearly polarizing plate 20 converts display light from the display panel 10 to linearly polarized light ((i) in FIG. 3, e.g., linearly polarized light oscillating in the vertical direction). The linearly polarized light having passed through the linearly polarizing plate 20 passes in the same polarization state through the first polarized light-selective reflector 31 ((ii) in FIG. 3, e.g., linearly polarized light oscillating in the vertical direction). The linearly polarized light having passed through the first polarized light-selective reflector 31 is converted to circularly polarized light by a λ/4 plate as the first phase difference plate 41 ((iii) in FIG. 3, e.g., counterclockwise circularly polarized light). The circularly polarized light having passed through the first phase difference plate 41 passes in the same polarization state through the first lens 51 ((iv) in FIG. 3, e.g., counterclockwise circularly polarized light). The circularly polarized light having passed through the first lens 51 is reflected by the semi-transparent mirror 60 to be converted to circularly polarized light rotating in reverse ((v) in FIG. 3, e.g., clockwise circularly polarized light).

The circularly polarized light reflected by the semi-transparent mirror 60 passes in the same polarization state through the first lens 51 ((vi) in FIG. 3, e.g., clockwise circularly polarized light). The circularly polarized light having passed through the first lens 51 passes through the first phase difference plate 41 to be converted to linearly polarized light ((vii) in FIG. 3, e.g., linearly polarized light oscillating in the horizontal direction). The linearly polarized light having passed through the first phase difference plate 41 is reflected in the same polarization state by the first polarized light-selective reflector 31 ((viii) in FIG. 3, e.g., linearly polarized light oscillating in the horizontal direction).

The linearly polarized light reflected by the first polarized light-selective reflector 31 passes through the first phase difference plate 41 to be converted to circularly polarized light ((ix) in FIG. 3, e.g., clockwise circularly polarized light). The circularly polarized light having passed through the first phase difference plate 41 passes in the same polarization state through the first lens 51, the semi-transparent mirror 60, and the second lens 52 ((x) to (xii) in FIG. 3, e.g., clockwise circularly polarized light). The circularly polarized light having passed through the second lens 52 passes through the second phase difference plate 42 to be converted to linearly polarized light ((xiii) in FIG. 3, e.g., linearly polarized light oscillating in the horizontal direction). The linearly polarized light having passed through the second phase difference plate 42 passes in the same polarization state through the second polarized light-selective reflector 32 to be perceived by the viewer U ((xiv) in FIG. 3, e.g., linearly polarized light oscillating in the horizontal direction).

As described above, the display device 100 of the present embodiment based on the folded optics that causes light to be reflected between the semi-transparent mirror 60 and the first polarized light-selective reflector 31 and between the semi-transparent mirror 60 and the second polarized light-selective reflector 32, so that the path of light (display light) emitted from the display panel 10 toward the viewer U is folded before reaching the viewer U. This enables a long optical path while reducing the thickness of the display device 100.

Also, in the display device 100 of the present embodiment, light emitted from the display panel 10 can take two paths (first path R1 and second path R2), which can lead to high light use efficiency. Such a display system is also referred to as a double path system. Hereinbelow, the display device 100 of the present embodiment is described in detail.

(Lens)

As shown in FIG. 4, preferably, the first lens 51 is a first Fresnel lens 51A with a first step 51AS and the second lens 52 is a second Fresnel lens 52A with a second step 52AS. This configuration increases the flexibility of design, thus effectively enabling a display device to have a thin profile.

Examples of a configuration in which in a cross-sectional view in a direction from the display panel 10 toward the second polarized light-selective reflector 32, the first lens 51 and the second lens 52 have shapes asymmetric about the semi-transparent mirror 60 as a plane of symmetry include a configuration in which in a cross-sectional view in a direction from the display panel 10 toward the second polarized light-selective reflector 32, the first step 51AS and the second step 52AS have shapes asymmetric about the semi-transparent mirror 60 as a plane of symmetry. Although a step in a Fresnel lens tends to be visible, the first step 51AS and the second step 52AS in the present embodiment are less visible since in a cross-sectional view in a direction from the display panel 10 toward the second polarized light-selective reflector 32, the first step 51AS and the second step 52AS have shapes asymmetric about the semi-transparent mirror 60 as a plane of symmetry. This enables enhancement of display characteristics. For example, deterioration of image quality (phenomenon in which the image gets dark and/or stray light is perceived) due to a step in a Fresnel lens can be reduced or prevented.

In a case where the first step 51AS and the second step 52AS have shapes asymmetric about the semi-transparent mirror 60 as a plane of symmetry, for example, at least part of the first step 51AS and at least part of the second step 52AS have shapes asymmetric about the semi-transparent mirror 60 as a plane of symmetry. Specifically, a first part of the first step 51AS and a first part of the second step 52AS have shapes asymmetric about the semi-transparent mirror 60 as a plane of symmetry while a second part of the first step 51AS and a second part of the second step 52AS may have shapes symmetric about the semi-transparent mirror 60 as a plane of symmetry and the whole of the first step 51AS and the whole of the second step 52AS may have shapes asymmetric about the semi-transparent mirror 60 as a plane of symmetry.

The first step 51AS and the second step 52AS each have a height of 0.01 μm or greater and 600 μm or smaller.

The first Fresnel lens 51A may include multiple first steps 51AS. The first steps 51AS may be arranged with the same pitch. The first steps 51AS may be the same height.

The second Fresnel lens 52A may include multiple second steps 52AS. The second steps 52AS may be arranged with the same pitch. The second steps 52AS may be the same height.

In the present embodiment, the pitch of the first steps 51AS in the first Fresnel lens 51A is different from the pitch of the second steps 52AS in the second Fresnel lens 52A. In other words, the pitch of the first steps 51AS in the first Fresnel lens 51A is shifted from the pitch of the second steps 52AS in the second Fresnel lens 52A. This configuration can differentiate the positions of the first steps 51AS from the positions of the second steps 52AS so that the steps are less visible. This enables enhancement of display characteristics. For example, deterioration of image quality (phenomenon in which the image gets dark and/or stray light is perceived) due to a step in a Fresnel lens can be reduced or prevented.

Figure 5:
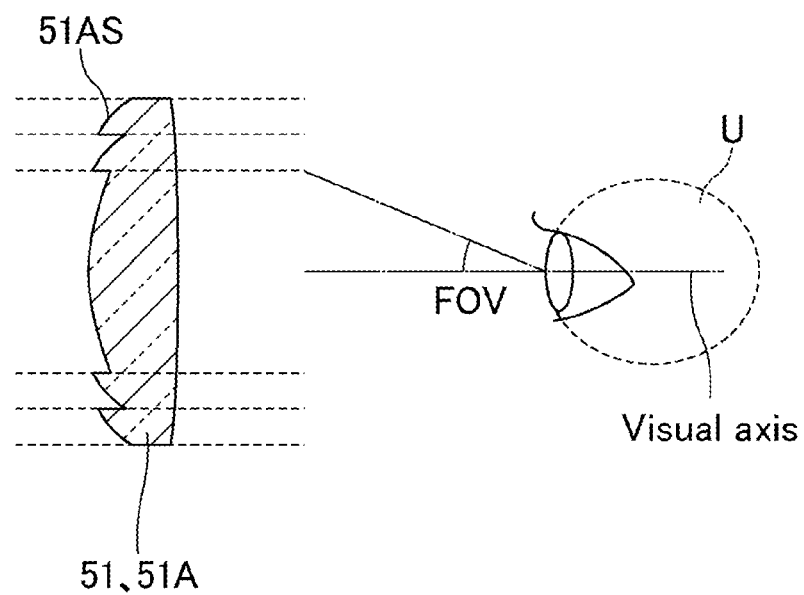
FIG. 5 is a schematic cross-sectional view showing a first Fresnel lens in the display device of Embodiment 1.

FIG. 5 is a schematic cross-sectional view showing a first Fresnel lens in the display device of Embodiment 1. Preferably, the first steps 51AS are provided only in a region where the angle of incidence of video light from the display panel 10 relative to the visual axis of the viewer U (the angle is also referred to as a field of view: FOV) is 30° or greater and in a region where the angle of incidence of video light is −30° or smaller, the angle of incidence being measured in a state where eyes of the viewer U directly in front of a center of the display panel are directed to the center of the display panel 10. The range of angle (called "effective field of view") where one can receive information only by eye movements is considered to be horizontally substantially 30° and vertically substantially 20° at most. This means that the first steps 51AS, when provided only in a region where the FOV is 30° or greater and in a region where the FOV is −30° or smaller, are less visible, so that the display quality can be enhanced. The region where the FOV is 30° or greater and the region where the FOV is −30° or smaller are each also called "wide FOV region". The angle is measured as a positive value when it is between the visual axis of the viewer U and video light emitted from a point above the eyes of the viewer U based on the intersection of the visual axis and the display panel 10. The angle is measured as a negative value when it is between the visual axis of the viewer U and video light emitted from a point below the eyes of the viewer U based on the intersection of the visual axis and the display panel 10.

Figure 6:
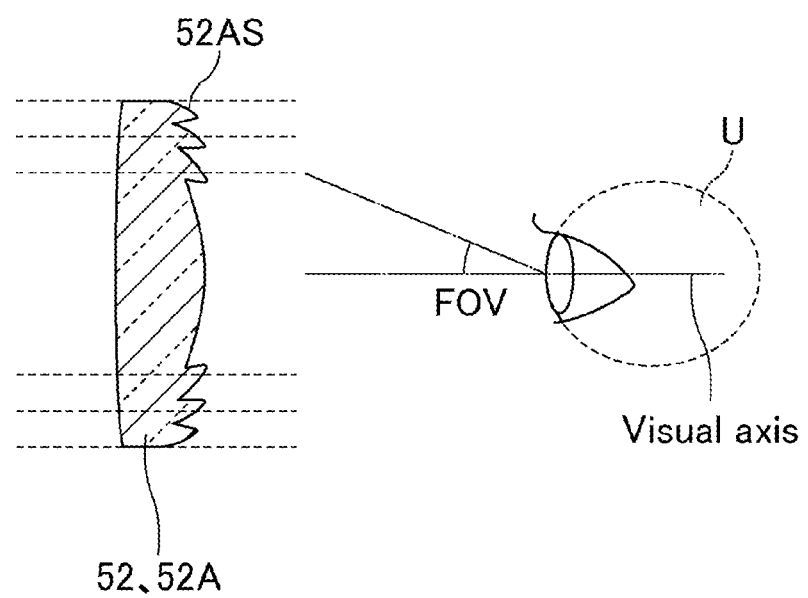
FIG. 6 is a schematic cross-sectional view showing a second Fresnel lens in the display device of Embodiment 1.

FIG. 6 is a schematic cross-sectional view showing a second Fresnel lens in the display device of Embodiment 1. Preferably, the second steps 52AS are provided only in a region where the angle of incidence of video light from the display panel 10 relative to the visual axis of the viewer U is 30° or greater and in a region where the angle of incidence of video light is −30° or smaller, the angle of incidence being measured in a state where eyes of the viewer U directly in front of a center of the display panel are directed to the center of the display panel 10. This configuration makes the second steps 52AS less visible, which can enhance the display quality.

As shown in FIG. 5 and FIG. 6, also when the first steps 51AS and the second steps 52AS are provided only in a region where the FOV is 30° or greater and in a region where the FOV is −30° or smaller, the pitch of the first steps 51AS is preferably different from the pitch of the second steps 52AS. This configuration makes the steps even less visible, thus enabling effective enhancement of the display quality.

(Display Panel)

The display panel 10 has a function of displaying images. The display panel 10 preferably includes pixels. The pixels are display units for displaying images and includes, in the case of color display, red, blue, and green pixels.

The display panel 10 may include a TFT substrate in which thin film transistors (TFTs) are arranged. The TFT substrate may include, on a supporting substrate, gate lines extending parallel to one another and source lines extending parallel to one another in a direction in which they intersect the gate lines via a gate insulator. The gate lines and the source lines may be formed in a grid pattern in a plan view. The regions defined by the gate lines and the source lines correspond to pixels.

The supporting substrate is preferably a transparent substrate and may be, for example, a glass substrate or a plastic substrate.

TFTs serving as switching elements may be arranged for the respective pixels at or near the respective intersections of the gate lines and the source lines. The gate terminal of each TFT may be connected to the corresponding gate line, the source terminal of the TFT may be connected to the corresponding source line, and the drain terminal of the TFT may be connected to the corresponding pixel electrode. The display panel 10 may include a common electrode to which a common electrode voltage is applied, in addition to the pixel electrodes.

Figure 7:
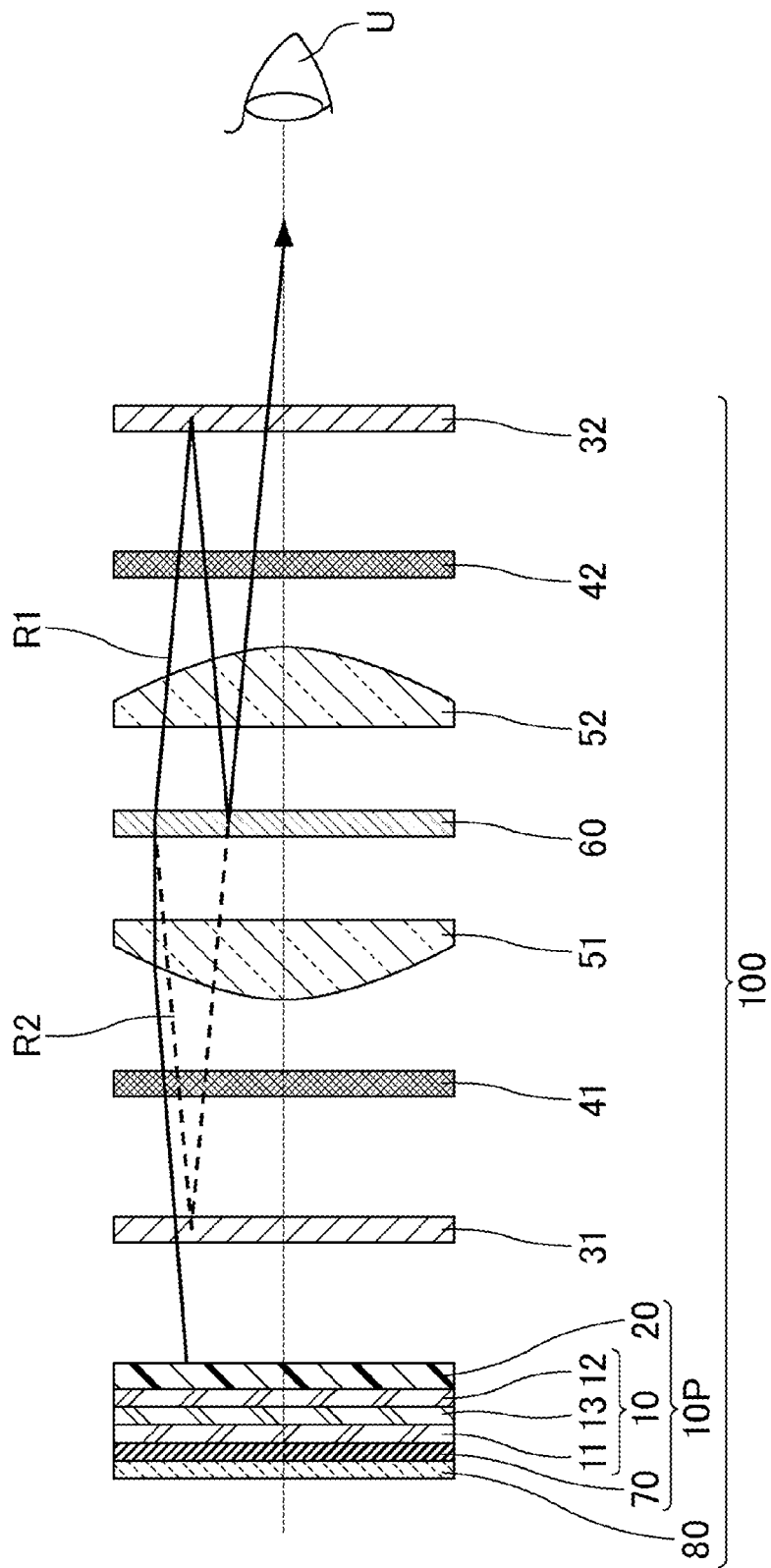
FIG. 7 is a schematic cross-sectional view showing an example of the display device of Embodiment 1.

FIG. 7 is a schematic cross-sectional view showing an example of the display device of Embodiment 1. As shown in FIG. 7, in the present embodiment, a panel including the display panel 10 and the linearly polarizing plate 20 is a liquid crystal panel 10P including a liquid crystal layer 13. Specifically, the display panel 10 includes a first substrate 11, a second substrate 12 facing the first substrate 11, and the liquid crystal layer 13 held between the first substrate 11 and the second substrate 12. The linearly polarizing plate 20 is a first linearly polarizing plate 20. The display device 100 further includes a second linearly polarizing plate 70 on the surface of the display panel 10 remote from the viewer U. The liquid crystal panel 10P more specifically includes the first linearly polarizing plate 20, the display panel 10, and the second linearly polarizing plate 70.

The first substrate 11 is, for example, a TFT substrate. Examples of the TFT substrate include one including, on a supporting substrate, gate lines extending parallel to one another, source lines extending parallel to one another in a direction in which they intersect the gate lines via a gate insulator, and TFTs arranged at the intersections of the gate lines and the source lines.

The display mode of the liquid crystal panel is not limited. The liquid crystal panel may be in a horizontal alignment (transverse electric field) mode in which a common electrode is disposed in the TFT substrate, or may be in a vertical alignment (vertical electric field) mode in which the common electrode is disposed in the counter substrate facing the TFT substrate across a liquid crystal layer.

The second substrate 12 is, for example, a counter substrate. The counter substrate may have a configuration in which, for example, color filters are arranged in the plane and partitioned by a black matrix. The color filters may include red color filters, green color filters, and blue color filters.

The black matrix can be one usually used in the field of liquid crystal panels and may be formed from a resin containing a black pigment, for example. The black matrix may be in a grid pattern that overlaps the gate lines and/or source lines in a plan view.

The present embodiment is described based on the case where the first substrate 11 is a TFT substrate and the second substrate 12 is a counter substrate. Yet, the first substrate 11 may be a counter substrate and the second substrate 12 may be a TFT substrate.

The liquid crystal layer 13 includes liquid crystal molecules. In response to voltage applied between the common electrode and the pixel electrodes, an electric field is generated in the liquid crystal layer 13, and the alignment of the liquid crystal molecules varies according to the electric field, so that the amount of light transmitted can be controlled. The alignment azimuth of the liquid crystal molecules with no voltage applied is controlled by the controlling force of the alignment films. The state with no voltage applied means a state where no voltage is applied between the pair of electrodes (to the liquid crystal layer) or voltage lower than the threshold for the liquid crystal molecules is applied between the electrodes (to the liquid crystal layer).

The anisotropy of dielectric constant (Δε) of the liquid crystal molecules defined by the following formula may be positive or negative.

Δε=(dielectric constant in long axis direction)−(dielectric constant in short axis direction)

An alignment film may be disposed between the first substrate 11 and the liquid crystal layer 13 and an alignment film may be disposed between the second substrate 12 and the liquid crystal layer 13. With no voltage applied to the liquid crystal layer 13, the alignment of liquid crystal molecules is controlled mainly by the force of the alignment films. For example, in a horizontal alignment mode, the tilt angle (pre-tilt angle) of liquid crystal molecules with no voltage applied may be from 0° to 5°, preferably from 0° to 3°, more preferably from 0° to 1°. The tilt angle of liquid crystal molecules means an angle at which the long axis direction (optic axis) of the liquid crystal molecules tilts toward the surface of the TFT substrate or the surface of the counter substrate.

When the display panel 10 includes the liquid crystal layer 13, the display device 100 preferably includes a backlight 80 on the surface of the liquid crystal panel 10P remote from the viewer U. The backlight 80 may be a direct-lit backlight or an edge-lit backlight. The direct-lit backlight includes a light source disposed on or behind the back surface of the liquid crystal panel. The edge-lit backlight includes a light guide plate disposed on or behind the back surface of the liquid crystal panel and a light source disposed at the side edge of the light guide plate. The edge-lit backlight utilizes the light source to illuminate the side edge of the light guide plate and utilizes the light guide plate to emit light toward the liquid crystal panel. A reflective sheet may be disposed on or behind the back surface of the light guide plate, and a prism sheet or a diffusing sheet, for example, may be disposed between the light guide plate and the liquid crystal panel.

The backlight 80 preferably causes light emitted from the light source to converge in the direction along the thickness of the liquid crystal panel 10P. The backlight may have a full width at half maximum of from 15° to 30°. The full width at half maximum can be defined by measuring the luminance viewing angle characteristics by a method in conformity with IEC 61747-30 and determining the range of angle in which the luminance is equal to or more than half of the maximum luminance.

(Linearly Polarizing Plate)

The linearly polarizing plate 20 (first linearly polarizing plate 20) is an absorptive polarizing plate. Examples of the linearly polarizing plate 20 include one obtained by adsorbing iodine molecules on a polyvinyl alcohol film and stretching the film into a sheet.

When the display device 100 includes the second linearly polarizing plate 70, the second linearly polarizing plate 70 can be one that is the same as the first linearly polarizing plate 20. Preferably, the transmission axis of the first linearly polarizing plate 20 and the transmission axis of the second linearly polarizing plate 70 are arranged perpendicular to each other, i.e., in crossed Nicols.

(Polarized Light-Selective Reflector)

A polarized light-selective reflector has a function of transmitting one of two linearly polarized lights whose polarization axes are perpendicular to each other and reflecting the other. Preferably, the first polarized light-selective reflector 31 has a function of transmitting first linearly polarized light with a polarization axis lying in the first direction (e.g., vertical direction) and reflecting second linearly polarized light with a polarization axis lying in the second direction (e.g., horizontal direction) perpendicular to the first direction. Preferably, the second polarized light-selective reflector 32 has a function of transmitting the second linearly polarized light with the polarization axis lying in the second direction (e.g., horizontal direction) and reflecting the first linearly polarized light with the polarization axis lying in the first direction (e.g., vertical direction).

The polarized light-selective reflector may be, for example, a reflective linearly polarizing plate. The reflective linearly polarizing plate may be a commercially available product as is or a secondary-processed (e.g., stretched) commercially available product. Examples of the commercially available product include "APCF" available from Nitto Denko Corporation, "DBEF" available from 3M Company, and "APF" available from 3M Company.

(Phase Difference Plate)

The first phase difference plate 41 and the second phase difference plate 42 each have a function of utilizing a birefringent material to introduce a phase difference to two polarized light components perpendicular to each other, for example, and thereby changing the polarization state of light incident thereon.

The first phase difference plate 41 and the second phase difference plate 42 are preferably λ/4 plates. A λ/4 plate is a phase difference plate that introduces an in-plane phase difference of from 107.5 nm to 167.5 nm to light having a wavelength of 550 nm. The in-plane phase difference (Re) refers to an in-plane phase difference to be introduced at 23° C. to light having a wavelength of 550 nm, unless otherwise stated. Re can be calculated from an equation Re=(nx−ny)×d, wherein d represents the thickness (nm) of the layer (phase difference plate). Herein, the "phase difference" represents an in-plane phase difference, unless otherwise stated. "nx" represents a refractive index in a direction in which the in-plane refractive index is maximum (i.e., slow axis direction). "ny" represents a refractive index in a direction perpendicular to the slow axis in the plane. "nz" represents a refractive index in the thickness direction. Each refractive index represents a value at 23° C. for light having a wavelength of 550 nm, unless otherwise stated.

(Semi-Transparent Mirror)

The semi-transparent mirror 60 is an optical element that reflects part of incident light while transmitting the rest of the incident light. The reflectance and the transmittance of the semi-transparent mirror 60 are not limited. For example, the semi-transparent mirror 60 reflects from 30% to 70% of incident light while transmitting the rest, and preferably reflects 50% of incident light while transmitting the remaining 50%. The semi-transparent mirror 60 can be formed from, for example, a metal film or a dielectric multilayer film. Controlling the film thickness enables control of the transmittance and reflectance.

Embodiment 2

In the present embodiment, features unique to the present embodiment are mainly described and description of the same features as in Embodiment 1 is omitted. A display device of the present embodiment is the same as the display device 100 of Embodiment 1, except that the first lens 51 and the second lens 52 are different ones.

Figure 8:
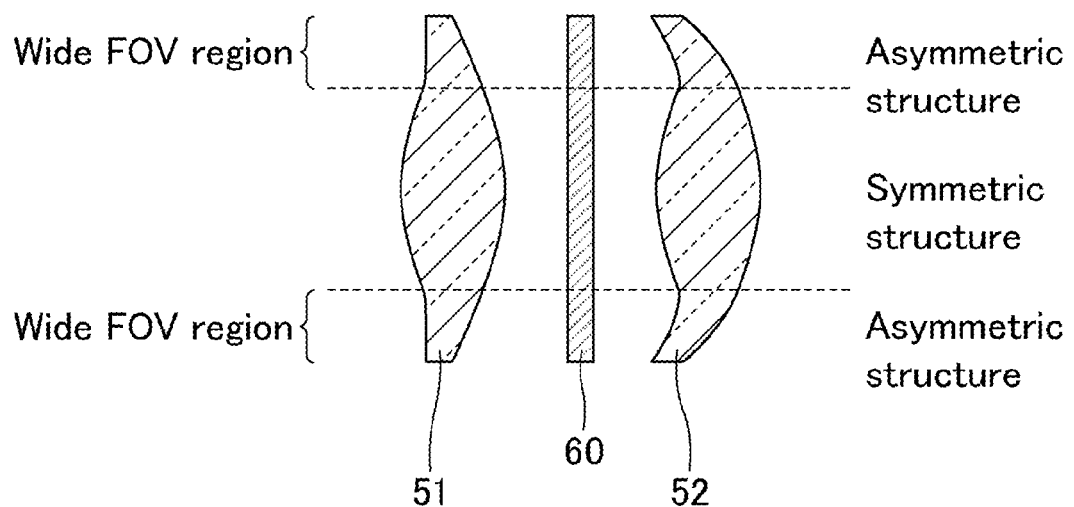
FIG. 8 is a schematic cross-sectional view of a first lens and a second lens in s display device of Embodiment 2.

FIG. 8 is a schematic cross-sectional view of a first lens and a second lens in s display device of Embodiment 2. In a cross-sectional view in a direction from the display panel 10 toward the second polarized light-selective reflector 32, the first lens 51 and the second lens 52 have shapes asymmetric about the semi-transparent mirror 60 as a plane of symmetry. Examples of such a configuration include one in which, for example, as shown in FIG. 8, in a cross-sectional view in a direction from the display panel 10 toward the second polarized light-selective reflector 32, the first lens 51 and the second lens 52 have shapes asymmetric about the semi-transparent mirror 60 as a plane of symmetry in a region where the angle of incidence of video light from the display panel 10 relative to the visual axis of the viewer U is 30° or greater and in a region where the angle of incidence of video light is −30° or smaller, the angle of incidence being measured in a state where eyes of the viewer directly in front of a center of the display panel are directed to the center of the display panel 10, and the first lens 51 and the second lens 52 have shapes symmetric about the semi-transparent mirror 60 as a plane of symmetry in a region where the angle of incidence of video light from the display panel 10 relative to the visual axis of the viewer U is greater than −30° and smaller than 30°. This configuration effectively enables a display device to have a thin profile. The configuration also enables enlargement of FOV, for example, to thereby increase the flexibility of design.

Figure 9:
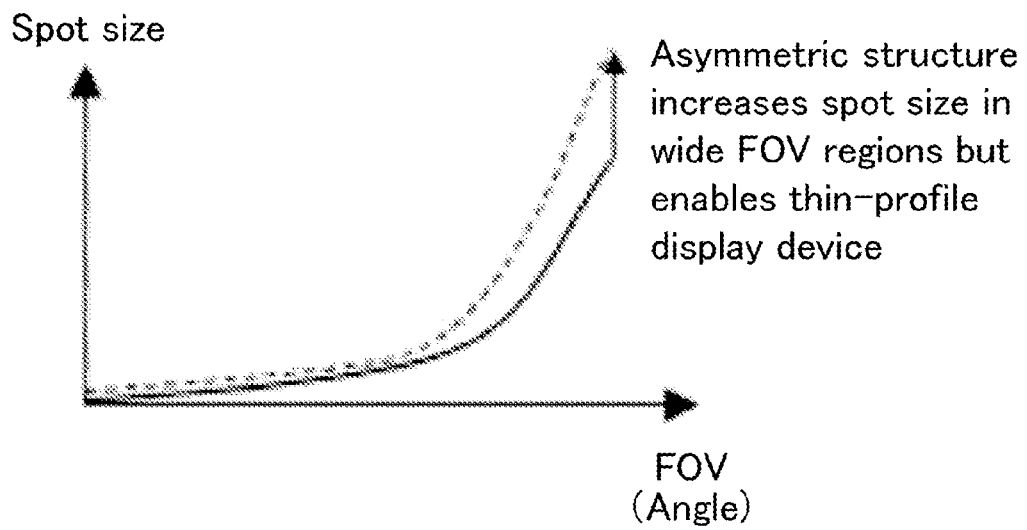
FIG. 9 is a graph showing the relationship between FOV and the spot diagram in the display device of Embodiment 2.

FIG. 9 is a graph showing the relationship between FOV and the spot diagram in the display device of Embodiment 2. The present embodiment employs a structure in which the first lens 51 and the second lens 52 are asymmetric in the wide FOV regions, which possibly disadvantageously increases the spot size in the wide FOV regions as shown in FIG. 9. Still, the structure in which the first lens 51 and the second lens 52 are asymmetric in the wide FOV regions effectively enables a display device to have a thin profile. In this manner, the present embodiment can achieve a display device having a thin profile by making the symmetrically arranged lenses (first lens 51 and second lens 52) asymmetric in the wide FOV regions.

The first lens 51 and the second lens 52 may each be any lens that enlarges/reduces images on the display panel 10. The first lens 51 and the second lens 52 may each be a refractive lens or a diffractive lens.

The refractive lens can be one usually used in the field of HMDs. Examples thereof include refractive lenses having curved surface(s) (convex surface(s)), including plano-convex lenses, double-convex lenses, and meniscus lenses. A Fresnel lens may be used in combination. The refractive lens may be an achromatic lens fabricated by attaching two lenses with different wavelength dispersions to each other, or may be a combination of a plurality of lenses.

Examples of the diffractive lens include Pancharatnam-Berry (PB) lenses and transparent holographic optical elements.

A PB lens causes one of left-handed circularly polarized light and right-handed circularly polarized light to converge while causing the opposite-handed circularly polarized light incident thereon to diverge. With a PB lens, the display device 100 using folded optics can exhibit enhanced display characteristics. For example, the display device 100 can more favorably optimize the image quality in folded optics and, in particular, provide an optical system with a wide field of view (FOV).

The PB lens includes a supporting substrate and liquid crystal molecules on the supporting substrate, and has a structure in which in a plan view of the PB lens as viewed by the viewer U, a long axis (a long axis direction) of the liquid crystal molecules rotates counterclockwise or clockwise from the center to the outside of the PB lens.

A transparent holographic optical element used as the diffractive lens can form an image on the display panel 10 by utilizing the diffraction phenomenon of light described above. The holographic film can be one imparted with the desired optical characteristics by interference lithography using lights corresponding to the incident light and the emission light. A holographic film is also producible by a method called computer-generated holography (CGH) used to achieve the desired optical characteristics by individually illuminating small areas of an object.

Modified Example 1 of Embodiments 1 and 2

Although the display devices 100 including two lenses (first lens 51 and second lens 52) have been described in Embodiments 1 and 2, the display device 100 may include a lens other than the first lens 51 and the second lens 52.

Figure 10:
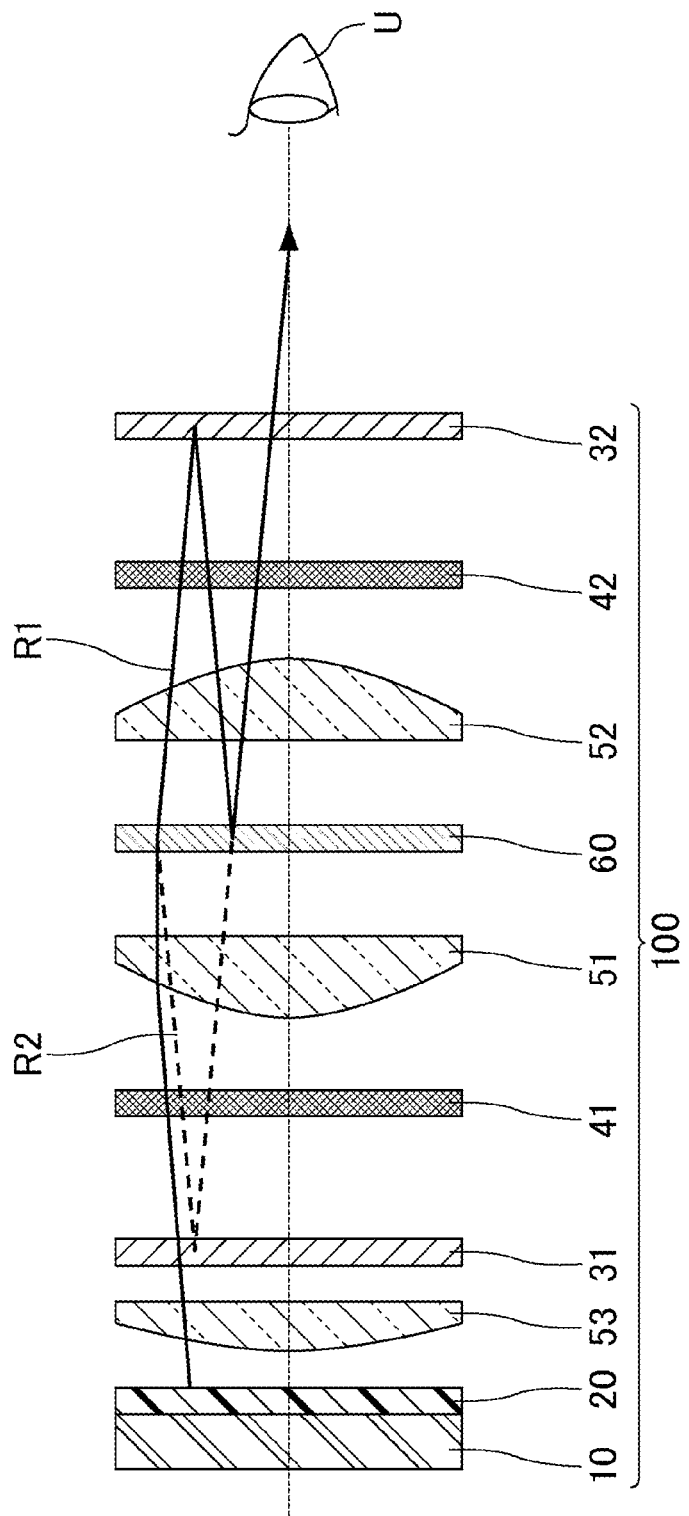
FIG. 10 is an example of an exploded cross-sectional view schematically showing a display device of Modified Example 1 of Embodiments 1 and 2.
Figure 11:
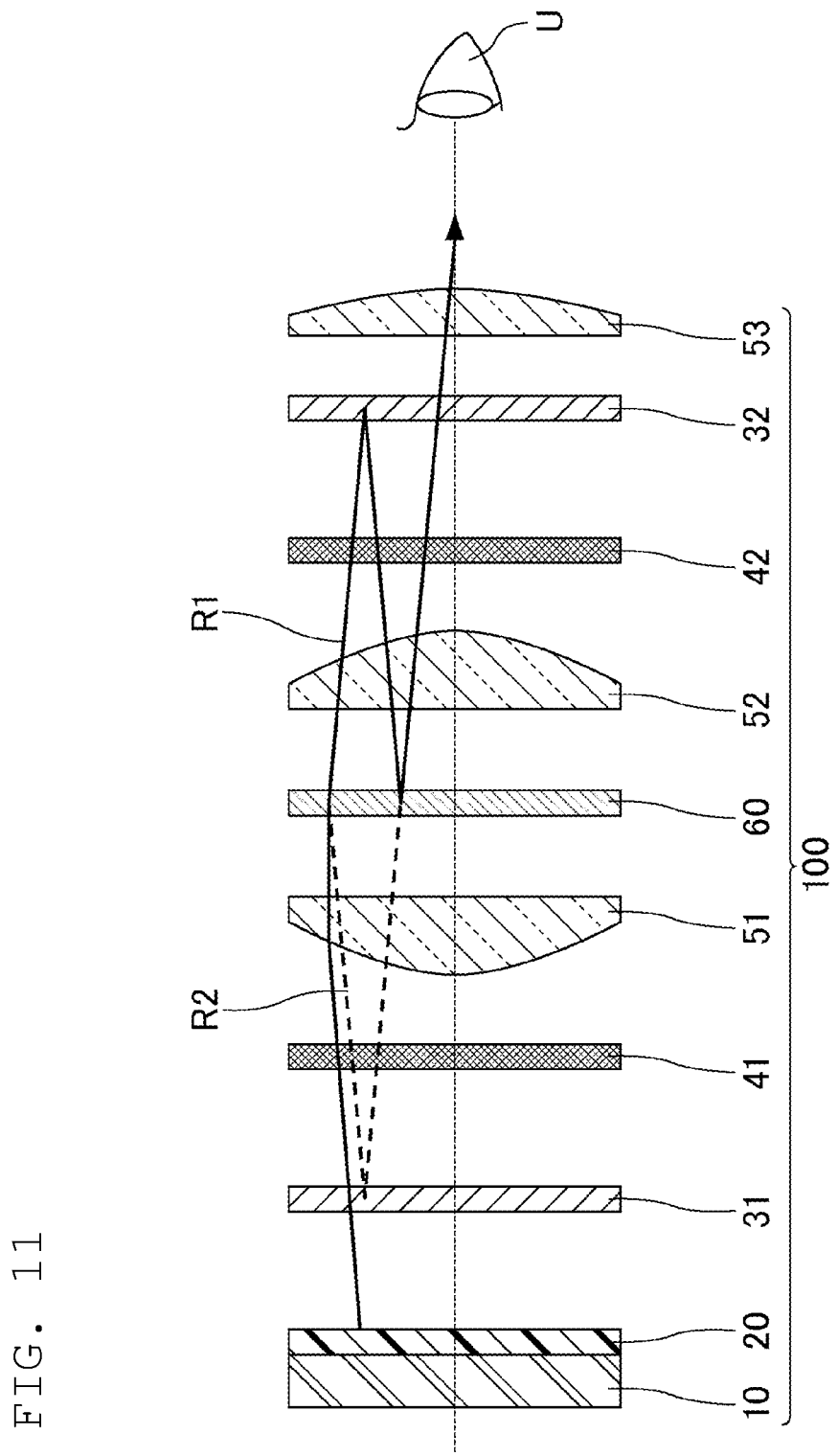
FIG. 11 is an example of an exploded cross-sectional view schematically showing the display device of Modified Example 1 of Embodiments 1 and 2.

FIG. 10 and FIG. 11 are each an example of an exploded cross-sectional view schematically showing a display device of Modified Example 1 of Embodiments 1 and 2. As shown in FIG. 10 and FIG. 11, the display device 100 may further include a third lens 53 outside the region between the first polarized light-selective reflector 31 and the second polarized light-selective reflector 32. This configuration can increase the flexibility of design.

The third lens 53 is a lens that is the same as the first lens 51 and the second lens 52. The third lens 53, as is placed outside the region in which the symmetry should be maintained, may be any lens, but is preferably a double-convex lens or a plano-convex lens to achieve a wide FOV, thin-profile HMD. Meanwhile, an interface with air possibly causes loss of transmittance or produces stray light from reflected light to thereby decrease the contrast ratio or produce ghost images. Thus, for reduction in such interfaces, the third lens 53 may also be a convex meniscus lens attached to the curved surface of the second polarized light-selective reflector 32 in FIG. 11. The second polarized light-selective reflector 32 and the second phase difference plate 42 are provided, for example, along the curved surface (spherical surface) of the second lens 52, which also gives a curved surface (spherical surface, concave surface) to the third lens 53.

As shown in FIG. 10, the display device 100 may further include the third lens 53 between the linearly polarizing plate 20 and the first polarized light-selective reflector 31. As shown in FIG. 11, the display device 100 may further include the third lens 53 between the second polarized light-selective reflector 32 and the viewer U.

Modified Example 2 of Embodiments 1 and 2

Although the cases where the display panel 10 is a liquid crystal panel have been described in Embodiments 1 and 2, the display panel 10 may be a self-luminous panel. When the display panel 10 is a self-luminous panel, too, as in the case where the display panel 10 is a liquid crystal panel, polarized light is emitted to the first polarized light-selective reflector 31.

Figure 12:
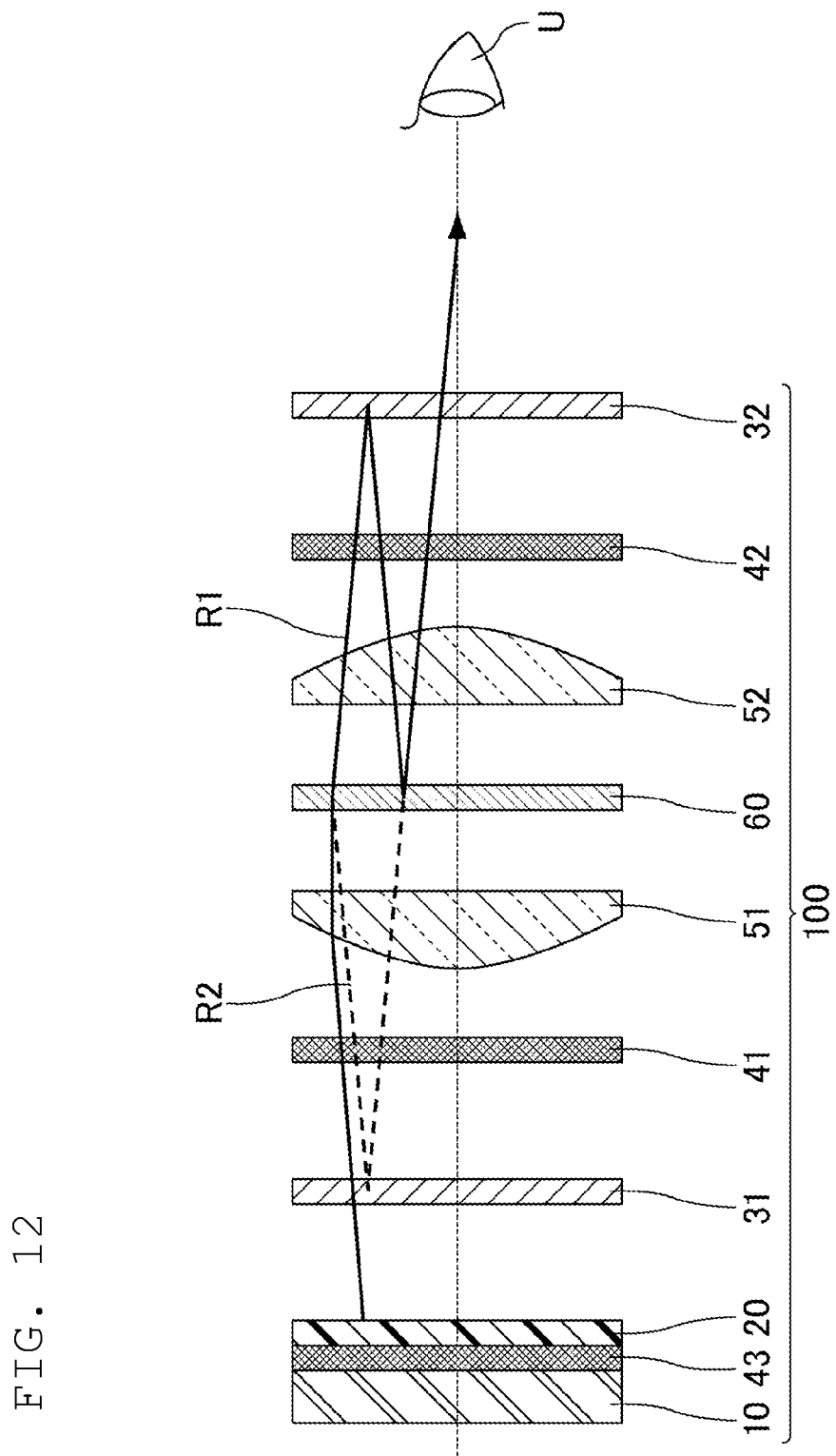
FIG. 12 is an exploded cross-sectional view schematically showing a display device of Modified Example 2 of Embodiments 1 and 2.

FIG. 12 is an exploded cross-sectional view schematically showing a display device of Modified Example 2 of Embodiments 1 and 2. As shown in FIG. 12, a display device 100 of the present modified example includes a third phase difference plate 43 between the display device 100 and a linearly polarizing plate 20. The third phase difference plate 43 has a function of utilizing a birefringent material to introduce a phase difference to two polarized light components perpendicular to each other, for example, and thereby changing the polarization state of light incident thereon.

The third phase difference plate 43 is preferably a λ/4 plate. This configuration enables a stack of the third phase difference plate 43 and the linearly polarizing plate 20 to function as a circularly polarizing plate, thus improving the anti-reflection function.

The self-luminous panel may be an organic light emitting diode (OLED) panel including OLEDs or a quantum dot light emitting diode (QD-LED) panel including QD-LEDs. The OLEDs and QD-LEDs herein are also referred to simply as light emitting diodes (LEDs) when no distinction is made between them.

A case is described where the display panel 10 is a self-luminous panel such as an OLED panel or a QD-LED panel. The configuration of each light emitting diode is not limited, and may be, for example, a stack including in the following order a cathode, an electron transport layer, a light-emitting layer, a hole transport layer, and an anode.

The materials of the cathode and the anode are not limited, and may each be, for example, a transparent conductive material such as indium tin oxide (ITO), indium zinc oxide (IZO), $In_2O_3$, $SnO_2$, or ZnO, aluminum, silver, or an alloy of these.

In the case of a top-emitting LED, the pixel electrodes in the TFT substrate may be used as the anode while the common electrode may be used as the cathode. Reflective electrode(s) formed from aluminum, silver, or an alloy of these may be used as the anode while any of the above transparent conductive materials may be used as the cathode.

The hole transport layer transports holes injected from the anode to the light-emitting layer. The material of the hole transport layer is not limited and may be, for example, an amine-based compound such as N,N,N',N'-tetraphenylbenzidine or a derivative thereof.

The electron transport layer transports electrons injected from the cathode to the light-emitting layer. The material of the electron transport layer is not limited and may be, for example, a phenanthroline derivative such as 2,9-dimethyl-4,7-diphenyl-1,10-phenanthroline (BCP), a quinoline derivative such as tris(8-quinolinolato) aluminum ($Alq_3$), an azaindolizine derivative, an oxadiazole derivative, a perylene derivative, a pyridine derivative, a pyrimidine derivative, a quinoxaline derivative, a diphenylquinone derivative, or a nitro-substituted fluorene derivative.

An electron injection layer may be disposed between the cathode and the electron transport layer. A hole injection layer may be disposed between the anode and the hole transport layer. The material of the electron injection layer can be an inorganic insulating material. Examples thereof include oxides of an alkali metal, halides of an alkali metal, oxides of an alkaline earth metal, and halides of an alkaline earth metal.

When the display panel 10 is an OLED panel, the light-emitting layer may include as a luminous material a fluorescent material or a phosphorescent material, for example.

When the display panel 10 is a QD-LED panel, the light-emitting layer may include quantum dots as the luminous material. The quantum dots are nano-sized (e.g., average particle size of from 2 to 10 nm) semiconductor crystals that exhibit optical characteristics governed by quantum mechanics. Examples thereof include colloidal particles each of which is composed of about 10 to 50 atoms.

Examples of the quantum dots include those formed from a compound such as cadmium selenide (CdSe), cadmium telluride (CdTe), cadmium sulfide (CdS), lead sulfide (PbS), or indium phosphide (InP), or an alloy such as CdSeS.

Each pixel may be provided with a light emitting diode (OLED or QD-LED). In the case of an OLED panel or a QD-LED panel, a red pixel, a green pixel, and a blue pixel may respectively be provided with a red LED (OLED or QD-LED) including a red luminous material-containing light-emitting layer, a green LED including a green luminous material-containing light-emitting layer, and a blue LED including a blue luminous material-containing light-emitting layer.

The pixel arrangement is not limited, and may be the Pentile arrangement in which the number of green pixels is twice the number of red pixels and the number of blue pixels or may be the real RGB arrangement in which red pixels, green pixels, and blue pixels are arranged at a ratio of 1:1:1.

Embodiment 3

Figure 13:
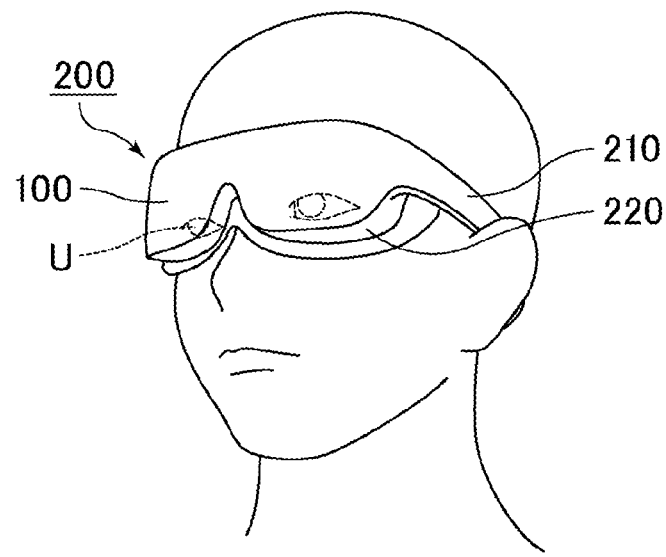
FIG. 13 is a schematic perspective view showing an example of the appearance of a head-mounted display of Embodiment 3.

In the present embodiment, features unique to the present embodiment are mainly described and description of the same features as in Embodiments 1 and 2 and modified examples thereof is omitted. FIG. 13 is a schematic perspective view showing an example of the appearance of a head-mounted display of Embodiment 3. As shown in FIG. 13, a head-mounted display 200 of the present embodiment includes a display device 100 and a wearable part 210 to be worn on the head of a viewer U. The head-mounted display 200 of the present embodiment may be an immersive HMD that surrounds the space in front of the eyes of the viewer U to shield the space from external light when worn on the head, or may be an eyeglass-type HMD.

The display device 100 has a function of displaying a video (images) to the viewer U. The display device 100 converts video display signals to a video.

When the head-mounted display 200 is an eyeglass-type HMD, as shown in FIG. 13, the portions corresponding to lenses of glasses may be defined by the display device 100, and the wearable part 210 may be the temples of glasses that sit on the ears of the viewer U.

When the head-mounted display 200 is an immersive HMD, the wearable part 210 may include a fitting band that surrounds the head when worn by the viewer U and fixes the head-mounted display 200 on the head of the viewer U.

The head-mounted display 200 may employ a one-display system using one display panel for both eyes, or a two-display system using one display panel for each eye. The immersive HMD described above is applicable to both the one-display system and the two-display system, for example. The eyeglass-type HMD is applicable to the two-display system, for example.

The head-mounted display 200 may further include a facial cushion 220 disposed between the display device 100 and the face of the viewer U. The facial cushion 220 is a cushioning material disposed between the display device 100 and the face of the viewer U. With the facial cushion 220, external light entering the field of view of the viewer U can be reduced while the head-mounted display 200 is used.

The head-mounted display 200 may further include a sound output unit that has a function of generating voice, music, sound effects, and other sounds.

The sound output unit converts sound output signals to sounds. Usually, products available as headphones can be used. The sound output unit, together with the wearable part 210, may function as a contact part that comes into contact with the ear when the head-mounted display 200 is worn on the head of the viewer U.

The head-mounted display 200 may include a driving unit that outputs video display signals and sound output signals. The driving unit is wired or wirelessly connected to the display device 100 and the sound output unit. The wireless communication system may be, for example, Bluetooth®.

EXAMPLE

The present invention is described below with reference to an example and a comparative example. The present invention is not limited to the example.

Comparative Example

Figure 14:
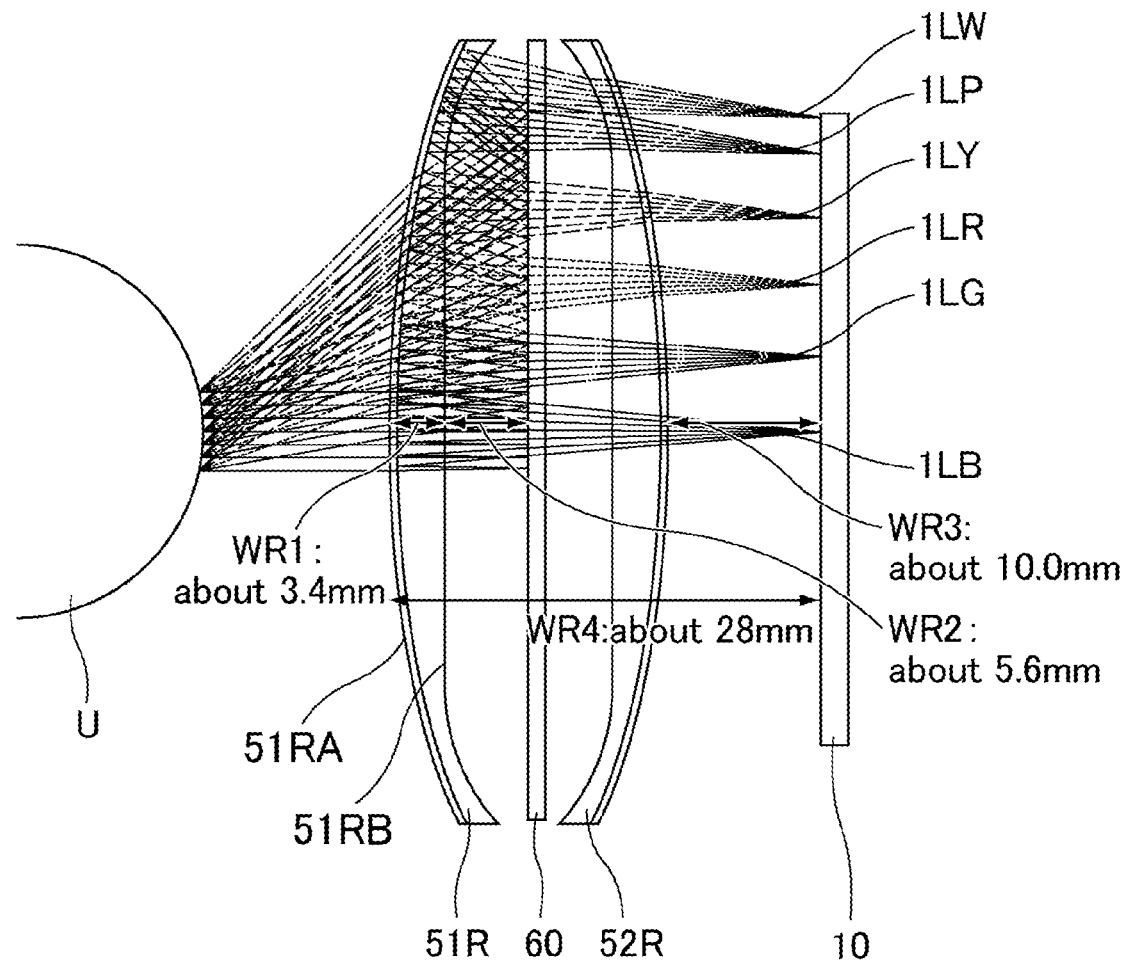
FIG. 14 shows simulation results of paths of light in a display device of a comparative example.

The optical paths in a display device 100R of a comparative example corresponding to the comparative embodiment were simulated. FIG. 14 shows simulation results of paths of light in a display device of a comparative example.

In FIG. 14, a linearly polarizing plate 20, a first polarized light-selective reflector 31, a first phase difference plate 41, a second phase difference plate 42, and a second polarized light-selective reflector 32 are omitted. FIG. 14 shows the simulation results showing how light-blue light 1LW, pink light 1LP, green light 1LG, red light 1LR, blue light 1LB, and yellow light 1LY from the display panel 10 each reached the viewer U through a first lens 51R, a semi-transparent mirror 60, and a second lens 52R.

For the simulations in the comparative example, the panel was a 2.5-inch one (2160×2160), the pixel size was about 20 μm, the refractive index of the lens material was 1.5 on the assumption of use of an acrylic resin, and the diameter of the lens was from 40 to 45 mm. The first lens 51R and the second lens 52R were pieces of the same lens and arranged symmetric about the semi-transparent mirror 60.

As shown in FIG. 14, the radius of curvature R of the center portion of a viewer U-side surface 51RA of a first lens 51R was about 139 mm (convex toward the viewer U) and became reduced (smaller) toward the end of the surface 51RA. The radius of curvature R of the center portion of a display panel 10-side surface 51RB of the first lens 51R was about 166 mm (convex toward the display panel 10) with a point of inflection at a position about 5 mm outward from the center of the surface 51RB, and became reduced (smaller) toward the end of the surface 51RB.

The thickness WR1 in the vicinity of the center of the first lens 51R and the thickness WR1 in the vicinity of the center of the second lens 52R were each about 3.4 mm. The distance WR2 between the first lens 51R (specifically, surface 51RB) and the semi-transparent mirror 60 and the distance WR2 between the second lens 52R (specifically, the viewer U-side surface of the second lens 52R) and the semi-transparent mirror 60 were each about 5.6 mm. The distance WR3 between the second lens 52R (specifically, the display panel 10-side surface of the second lens 52R) and the display panel 10 was about 10.0 mm. The width WR4 from the first lens 51R (specifically, surface 51RA) to the display panel 10 was about 28 mm. A display device having a symmetric configuration as in the comparative example was revealed to be limited to a certain degree in terms of thickness reduction as shown in FIG. 14 due to restriction from the use of the pieces of the same lens.

Figure 15:
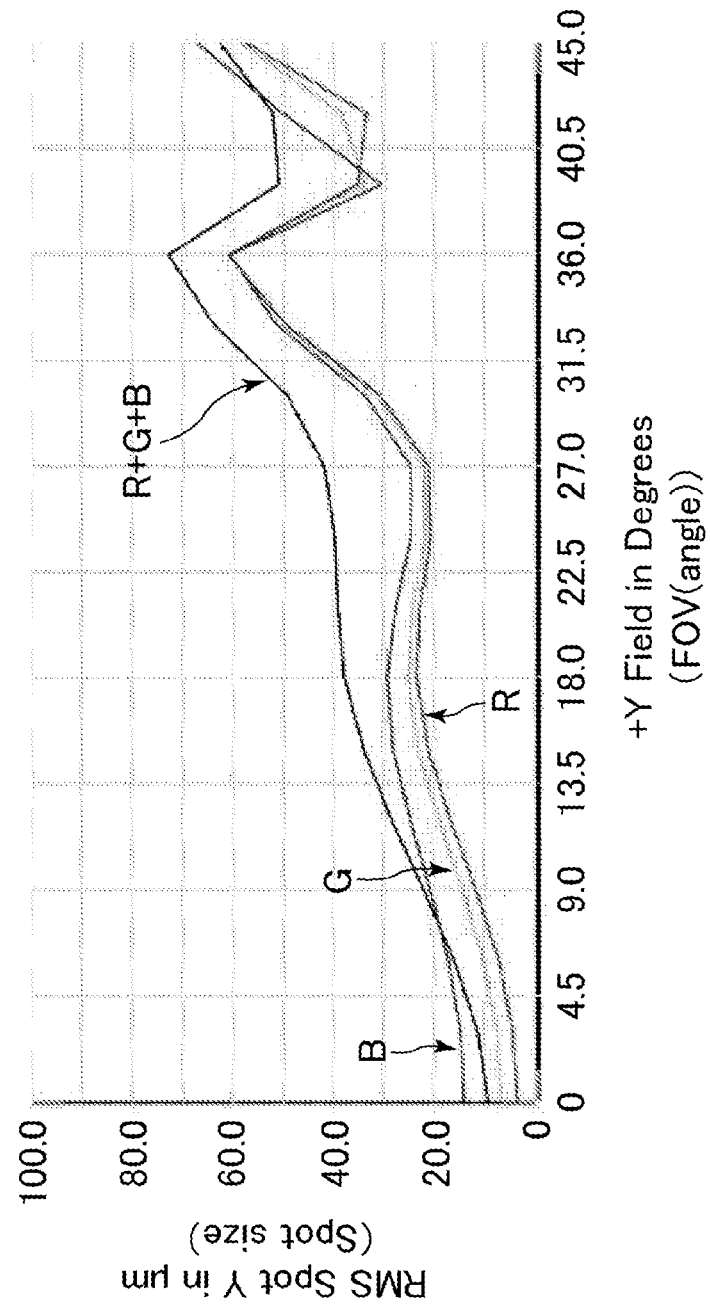
FIG. 15 shows simulation results from a spot diagram of the display device of the comparative example in a front view.

FIG. 15 shows simulation results from a spot diagram of the display device of the comparative example in a front view. The simulation results from a spot diagram of the display device 100R of the comparative example in a front view were as shown in FIG. 15.

An index of optical design optimization often used for lens optics is the spot diagram. This diagram shows how wide the light from a single point on a display device appears to the eyes. Specifically, a simulation was performed that demonstrated the paths of lights (video lights) output from one point on the display device at equal intervals, and the positions where the lights appear to the eyes of the viewer U. Then, the positional shifts of these lights output at equal intervals were evaluated using root mean square (RMS).

Liquid crystal display devices currently becoming the mainstream have a resolution of 1200 ppi. The size of each pixel is about 21 μm in such devices, so that the ideal RMS value is 21 μm or less. The resolving power of the human eye, however, decreases especially in a region with a wide angle of incidence (angle of incidence of roughly 20 degrees or wider), from which a presumption can be drawn that an RMS value of 5 pixels or less is acceptable.

EXAMPLE

Figure 16:
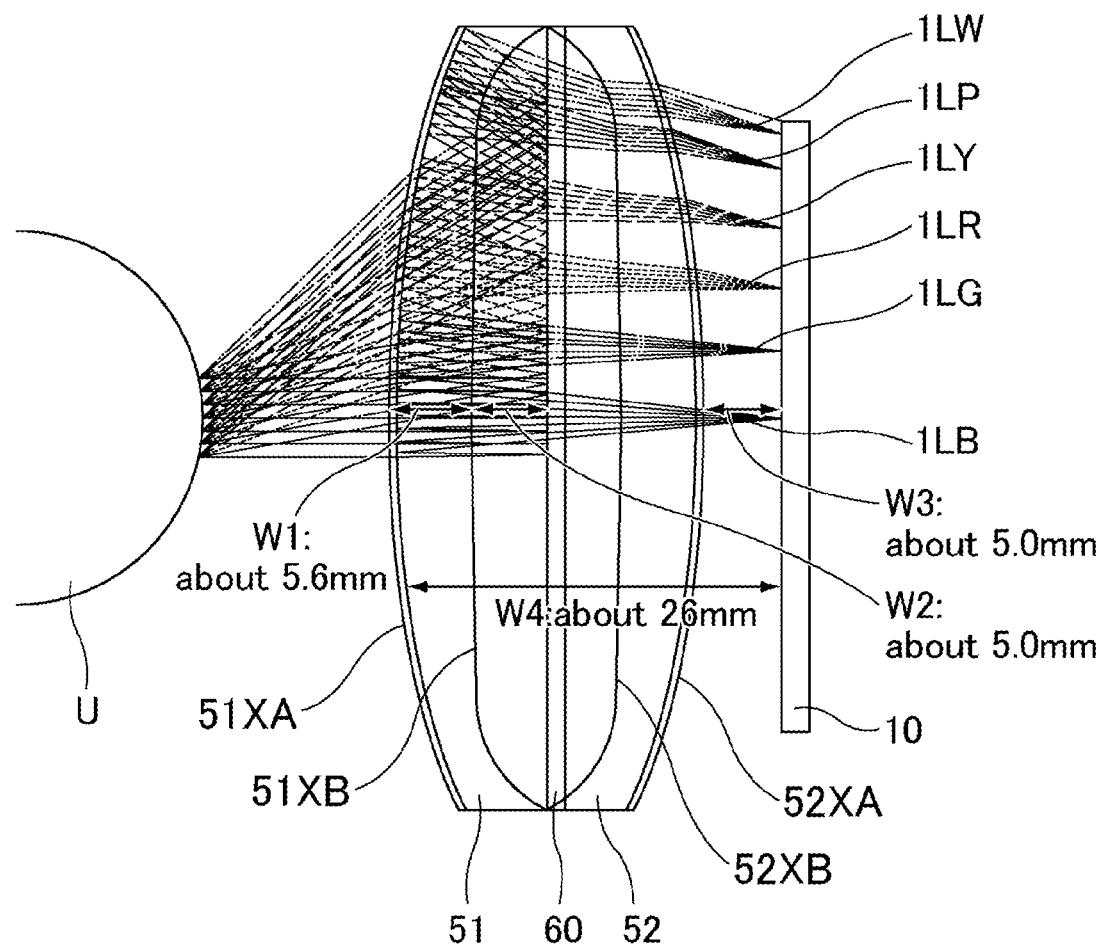
FIG. 16 shows simulation results of paths of light in a display device of an example.

The optical paths in a display device 100 of an example corresponding to Embodiment 1 were simulated. The display device 100 of the example was the same as the display device 100R of the comparative example, except that the first lens and the second lens were different ones. FIG. 16 shows simulation results of paths of light in a display device of an example.

In FIG. 16, a linearly polarizing plate 20, a first polarized light-selective reflector 31, a first phase difference plate 41, a second phase difference plate 42, and a second polarized light-selective reflector 32 are omitted. FIG. 16 shows the simulation results showing how light-blue light 1LW, pink light 1LP, green light 1LG, red light 1LR, blue light 1LB, and yellow light 1LY from the display panel 10 each reached the viewer U through a first lens 51, a semi-transparent mirror 60, and a second lens 52. Although the semi-transparent mirror 60 appears to be within the second lens 52 in the simulation results as shown in FIG. 16, the semi-transparent mirror 60 can practically be provided by removing the inner (viewer side) end of the second lens 52 since as shown by the light rays in FIG. 16, the inner end of the second lens 52 is not used.

For the simulations herein, the panel was a 2.5-inch one (2160×2160), the pixel size was about 20 μm, the refractive index of the lens material was 1.5 on the assumption of use of an acrylic resin, and the diameter of the lens was from 40 to 45 mm. The first lens 51 and the second lens 52 had shapes asymmetric about the semi-transparent mirror 60 as a plane of symmetry.

As shown in FIG. 16, the radius of curvature R of the center portion of a viewer U-side surface 51XA of a first lens 51 was about 88 mm (convex toward the viewer U) and became slightly reduced (smaller) toward the end of the surface 51XA. The radius of curvature R of the center portion of a display panel 10-side surface 51XB of the first lens 51 was about 440 mm (convex toward the display panel 10) with a point of inflection at a position about 7 mm outward from the center of the surface 51XB, and became rapidly reduced (smaller) toward the end of the surface 51XB.

A display panel 10-side surface 52XA of a second lens 52 had substantially the same shape as the viewer U-side surface 51XA of the first lens 51, though having a slightly more reduced (smaller) radius of curvature R than the surface 51XA from a point apart from the center of the surface 52XA by 15 mm to the end of the surface 52XA. A viewer U-side surface 52XB of the second lens 52 had an even more reduced (smaller) radius of curvature R than the display panel 10-side surface 51XB of the first lens 51 from a point apart from the center of the surface 52XB by 12 mm to the end of the surface 52XB.

The thickness W1 in the vicinity of the center of the first lens 51 was about 5.6 mm. The distance W2 between the first lens 51 (specifically, surface 51XB) and the semi-transparent mirror 60 was about 5.0 mm. The distance W3 between the second lens 52 (specifically, the display panel 10-side surface 52XA of the second lens 52) and the display panel 10 was about 5.0 mm. The width W4 from the first lens 51 (specifically, surface 51XA) to the display panel was about 26 mm. In the present example, the width W4 was successfully made smaller than the width WR4 in the comparative example. In the present example, the second lens 52 was asymmetric with respect to the first lens 51 in the region 12 mm or more outward from the center of the second lens 52, so that the thickness of the display device 100 was successfully reduced.

Figure 17:
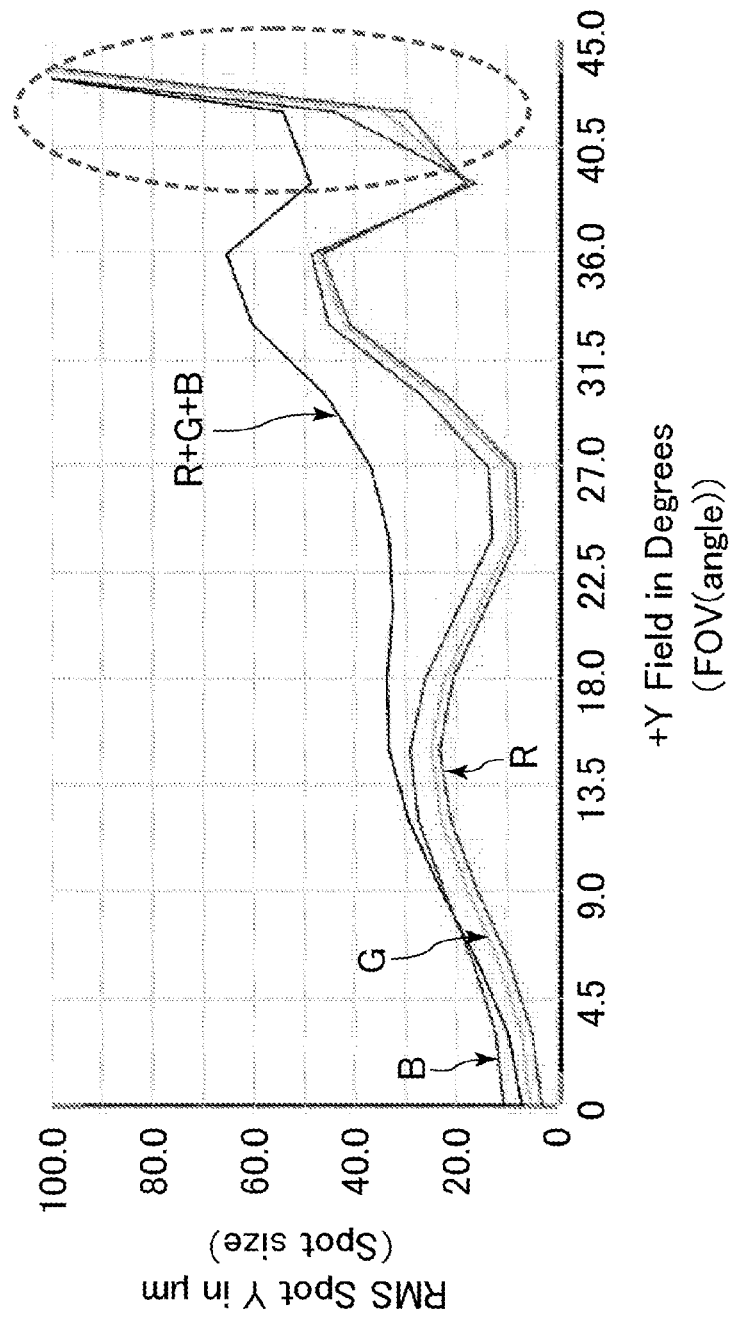
FIG. 17 shows simulation results from a spot diagram of the display device of the example in a front view.
Figure 18:
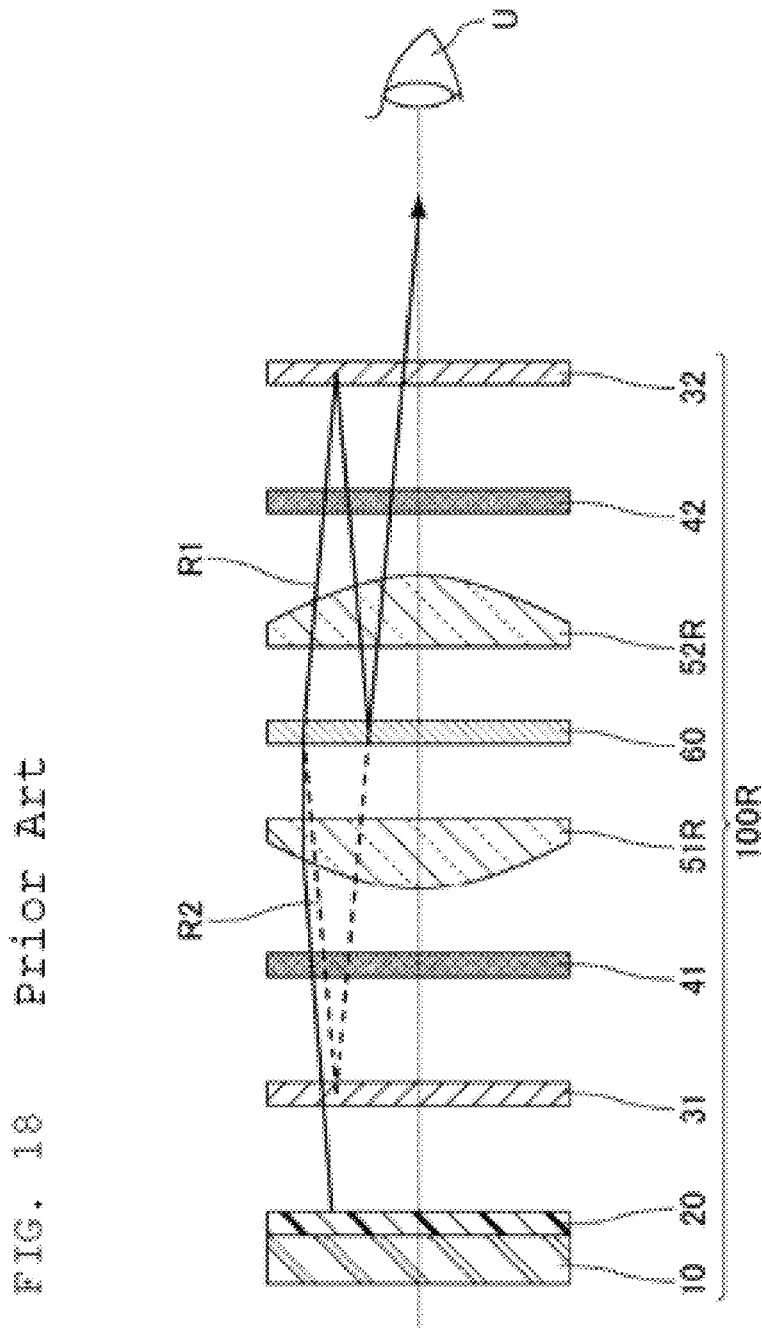
FIG. 18 is an exploded cross-sectional view schematically showing a display device of a comparative embodiment.

FIG. 17 shows simulation results from a spot diagram of the display device of the example in a front view. As shown by the region surrounded by the dashed line in FIG. 17, the display device 100 of the example possibly exhibits deteriorated modulation transfer function (MTF) when the FOV is 40 degrees or greater. In other words, the display device 100 of the example possibly exhibits poor results from the spot diagram in the wide FOV regions. Yet, the display device 100 will raise no practically significant problem since the wide FOV regions are difficult to perceive by the human eyes.

REFERENCE SIGNS LIST

1LB, 1LG, 1LP, 1LR, 1LW, 1LY: light
10: display panel
10P: liquid crystal panel
11, 12: substrate
13: liquid crystal layer
20, 70: linearly polarizing plate
31, 32: polarized light-selective reflector
41, 42, 43: phase difference plate
51, 51R, 52, 52R, 53: lens
51A, 52A: Fresnel lens
51AS, 52AS: step
51RA, 51RB, 51XA, 51XB, 52XA, 52XB: surface
60: semi-transparent mirror
80: backlight
R1, R2: path
100, 100R: display device
200: head-mounted display
210: wearable part
220: facial cushion
U: viewer
W1, WR1: thickness
W2, W3, WR2, WR3: distance
W4, WR4: width

What is claimed is:

1. A display device comprising:
    a display panel, a linearly polarizing plate, and a first polarized light-selective reflector disposed sequentially toward a viewer;
    a first phase difference plate and a first lens that are disposed closer to the viewer relative to the first polarized light-selective reflector and face each other;
    a semi-transparent mirror disposed closer to the viewer relative to the first phase difference plate and the first lens;
    a second lens and a second phase difference plate that are disposed closer to the viewer relative to the semi-transparent mirror and face each other; and
    a second polarized light-selective reflector disposed closer to the viewer relative to the second lens and the second phase difference plate,
    the first lens and the second lens having shapes asymmetric about the semi-transparent mirror as a plane of symmetry in a cross-sectional view in a direction from the display panel toward the second polarized light-selective reflector.

2. The display device according to claim 1,
    wherein the first lens is a first Fresnel lens with a first step, and
    the second lens is a second Fresnel lens with a second step.

3. The display device according to claim 2,
    wherein in a cross-sectional view in a direction from the display panel toward the second polarized light-selective reflector,
    the first step and the second step have shapes asymmetric about the semi-transparent mirror as a plane of symmetry.

4. The display device according to claim 2,
    wherein the first step is located only in a region where an angle of incidence of video light from the display panel relative to a visual axis of the viewer is 30° or greater and in a region where the angle of incidence of video light is −30° or smaller, the angle of incidence being measured in a state where eyes of the viewer directly in front of a center of the display panel are directed to the center of the display panel.

5. The display device according to claim 2,
    wherein the second step is located only in a region where an angle of incidence of video light from the display panel relative to a visual axis of the viewer is 30° or greater and in a region where the angle of incidence of video light is −30° or smaller, the angle of incidence being measured in a state where eyes of the viewer directly in front of a center of the display panel are directed to the center of the display panel.

6. The display device according to claim 1,
    wherein in a cross-sectional view in a direction from the display panel toward the second polarized light-selective reflector,
    the first lens and the second lens have shapes asymmetric about the semi-transparent mirror as a plane of symmetry in a region where an angle of incidence of video light from the display panel relative to a visual axis of the viewer is 30° or greater and in a region where the angle of incidence of video light is −30° or smaller, the angle of incidence being measured in a state where eyes of the viewer directly in front of a center of the display panel are directed to the center of the display panel, and
    the first lens and the second lens have shapes symmetric about the semi-transparent mirror as a plane of symmetry in a region where the angle of incidence of video light from the display panel relative to the visual axis of the viewer is greater than −30° and smaller than 30°.

7. The display device according to claim 1, further comprising a third lens located outside a region between the first polarized light-selective reflector and the second polarized light-selective reflector.

8. The display device according to claim 1,
wherein a panel including the display panel and the linearly polarizing plate is a liquid crystal panel including a liquid crystal layer.

9. The display device according to claim 1,
wherein the display panel is a self-luminous panel.

10. A head-mounted display comprising:
the display device according to claim 1; and
a wearable part to be worn on a head of the viewer.

* * * * *